(12) United States Patent
Kanno et al.

(10) Patent No.: US 8,243,417 B2
(45) Date of Patent: Aug. 14, 2012

(54) VARIABLE CAPACITOR AND ELECTRONIC DEVICE

(75) Inventors: Masayoshi Kanno, Kanagawa (JP); Kazutaka Habu, Tokyo (JP); Toshiaki Yokota, Miyagi (JP); Makoto Watanabe, Miyagi (JP)

(73) Assignee: Sony Corporation, Tokyo (JP)

( * ) Notice: Subject to any disclaimer, the term of this patent is extended or adjusted under 35 U.S.C. 154(b) by 503 days.

(21) Appl. No.: 12/427,279

(22) Filed: Apr. 21, 2009

(65) Prior Publication Data

US 2009/0257167 A1  Oct. 15, 2009

(30) Foreign Application Priority Data

Apr. 25, 2008  (JP) ................................. 2008-116242

(51) Int. Cl.
*H01G 7/00* (2006.01)
*H01G 5/01* (2006.01)
*H01L 27/108* (2006.01)
*H01L 29/94* (2006.01)

(52) U.S. Cl. .......................... 361/277; 361/278; 257/312

(58) Field of Classification Search .................. 361/277, 361/280, 281, 278; 310/325; 257/312
See application file for complete search history.

(56) References Cited

U.S. PATENT DOCUMENTS

| 4,636,824 | A | * | 1/1987 | Ikoma et al. ................... 257/365 |
| 5,986,864 | A | * | 11/1999 | Davis ............................... 361/58 |
| 6,072,687 | A | * | 6/2000 | Naito et al. ..................... 361/303 |
| 6,331,930 | B1 | * | 12/2001 | Kuroda et al. ............. 361/306.3 |
| 2007/0242411 | A1 | * | 10/2007 | Kanno .......................... 361/277 |

FOREIGN PATENT DOCUMENTS

| JP | 11-204369 A | 7/1999 |
| JP | 2002-252136 A | 9/2002 |
| JP | 2007-287996 A | 11/2007 |
| JP | 2008-066682 A | 3/2008 |
| WO | WO 2007/116566 A1 | 10/2007 |

* cited by examiner

*Primary Examiner* — Timothy Thompson
*Assistant Examiner* — Roshn Varghese
(74) *Attorney, Agent, or Firm* — Wolf, Greenfield & Sacks, P.C.

(57) ABSTRACT

Disclosed is a variable capacitor that includes signal electrodes configured to sandwich a dielectric layer so as to generate a signal electric field, and control electrodes configured to sandwich the dielectric layer so as to generate a control electric field in a direction intersecting with the signal electric field generated between the signal electrodes.

19 Claims, 18 Drawing Sheets

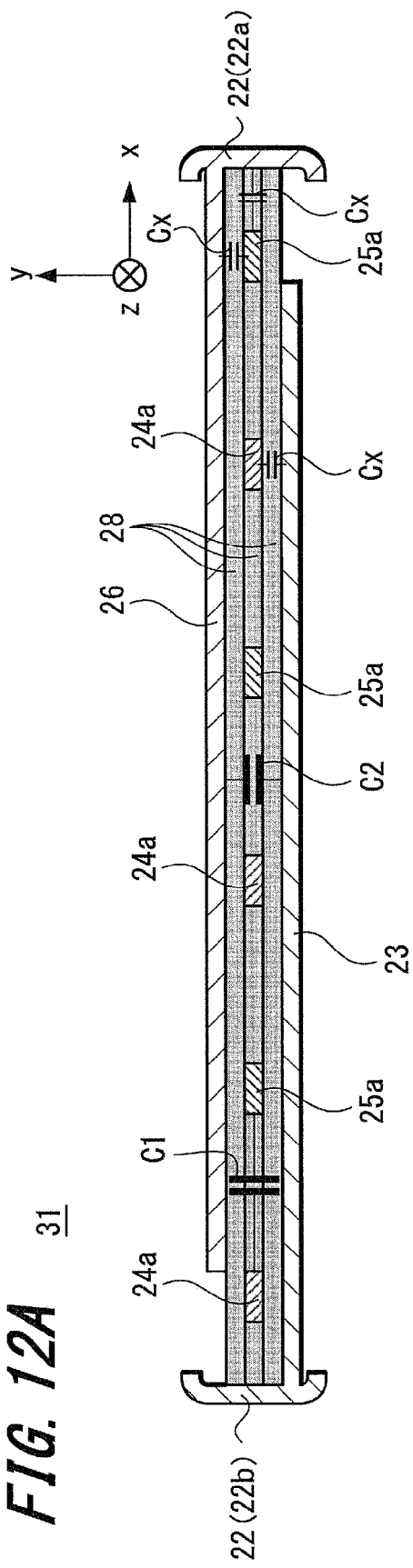
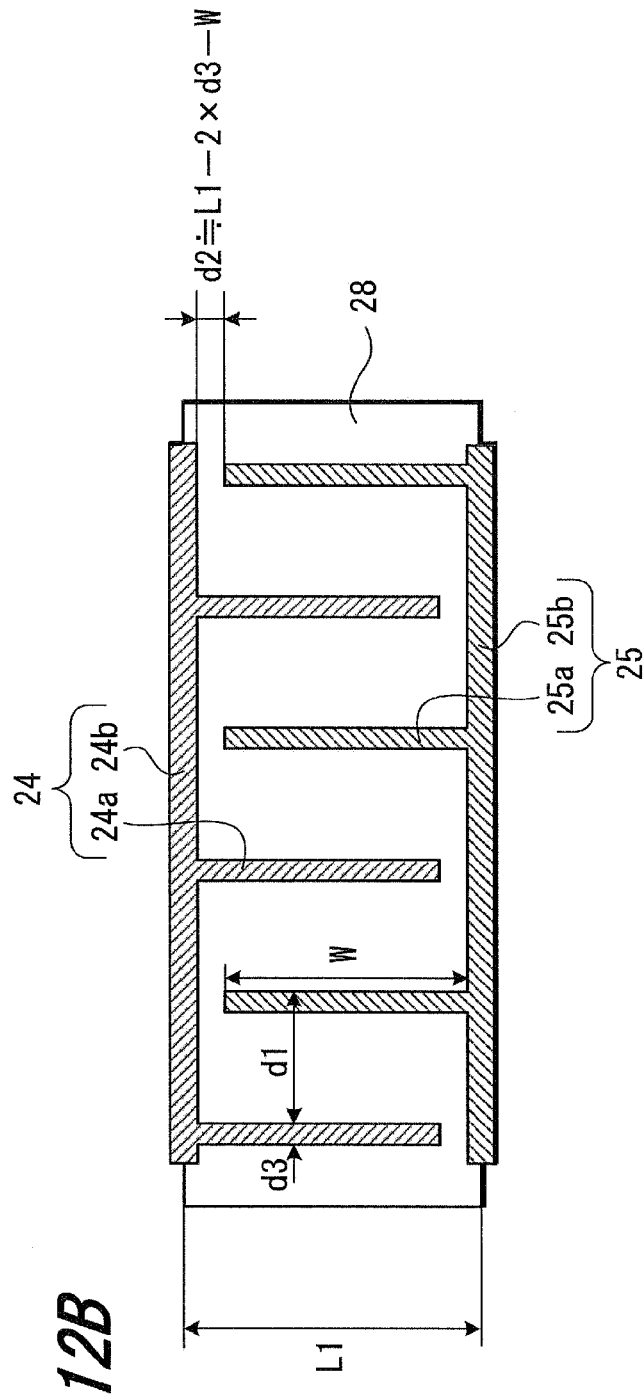
FIG. 12A
FIG. 12B 28  29

30  28

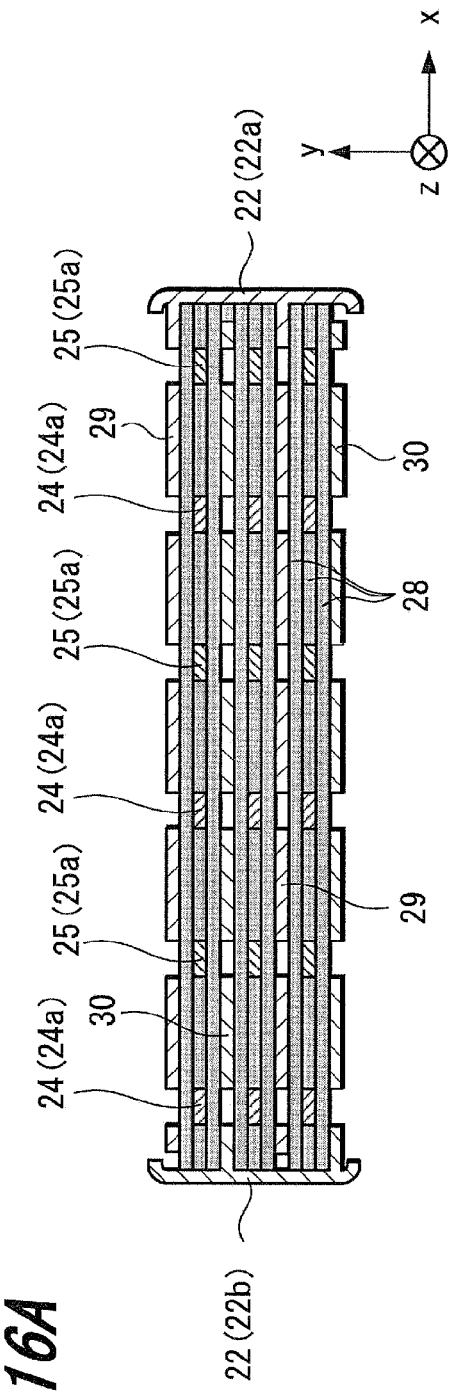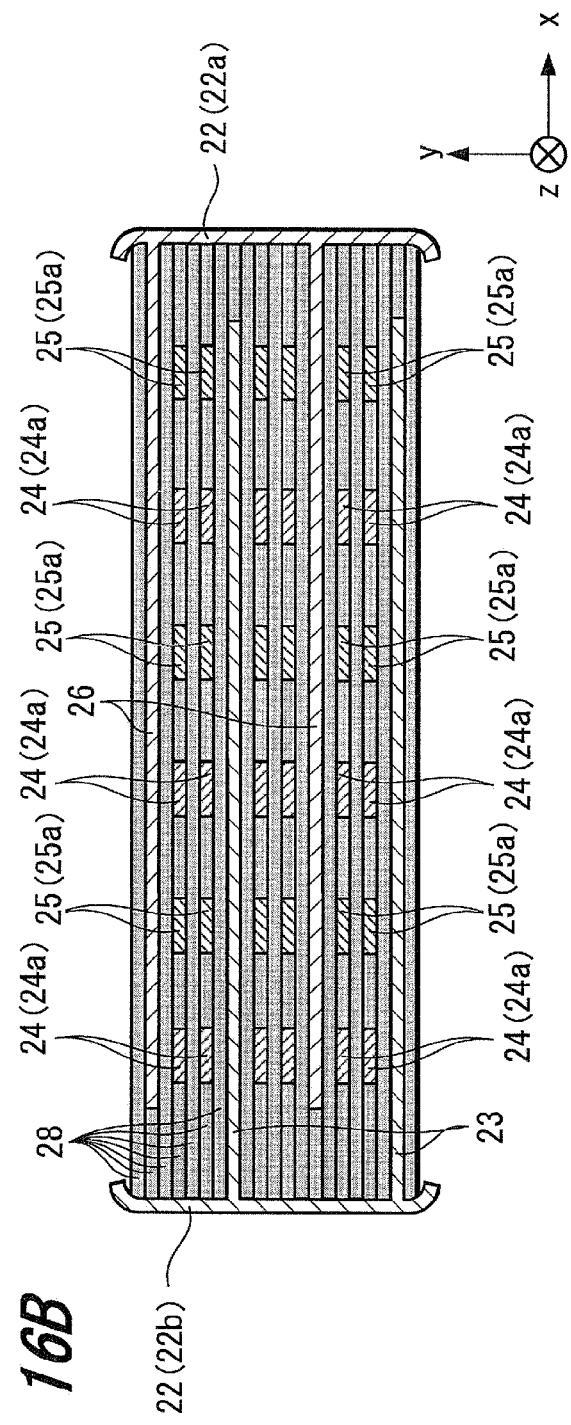

VARIABLE CAPACITOR AND ELECTRONIC DEVICE

BACKGROUND OF THE INVENTION

1. Field of the Invention

The invention relates to a variable capacitor including control electrodes to change capacitance thereof. More specifically, the invention relates to a variable capacitor in which control electric field independently controls signal electric field, and an electronic device utilizing such a variable capacitor.

2. Description of the Related Art

Variable capacitors are widely utilized in electronics for controlling frequency and time by externally applying bias signals thereto in order to vary the capacitance thereof, and are commercially produced, for example, as diodes (variable capacitance diodes) or MEMS (Micro Electro Mechanical Systems). The variable capacitors of this kind include no dedicated terminals for applying bias signals to control variable capacitance. That is, the variable capacitor includes commonly used two types of terminals only, namely, signal terminals and control terminals (two-terminal device). When the variable capacitor is used in a real circuit, the variable capacitor needs to have to four types of terminals as a circuit configuration shown in FIG. 1.

FIG. 1 shows an example of an equivalent circuit including a related art variable capacitor 150 with four types of terminals. In this example of the related art equivalent circuit, the variable capacitor 150 and a bias eliminating capacitor 151 are connected in series. In the equivalent circuit, a first electrode of the variable capacitor 150 is connected to a first electrode of a bias eliminating capacitor 151. In the equivalent circuit, the control voltage is applied via a resistor R to an interconnect connected between the first electrode of the bias eliminating capacitor 151 and the first electrode of the variable capacitor 150.

In the equivalent circuit, an AC signal flows in the bias eliminating capacitor 151 and the variable capacitor 150. A DC bias current flows only in the variable capacitor 150 via resistance R. As shown by the example of FIG. 1, a signal voltage source transmitting the AC signal and a control voltage source for the DC bias current are separately provided in the equivalent circuit.

However, although the control voltage source and the signal voltage source are independently provided in the equivalent circuit, the terminals are not independently provided for the signal voltage and the control voltage in the variable capacitor 150.

In the equivalent circuit having such a configuration, the AC signal is interfered with the DC bias current flown from the control voltage source.

Japanese Unexamined Patent Application Publication No. 2007-287996 has, for example, disclosed a variable capacitor including a ferroelectric material. The publication discloses the variable capacitor including an electrode structure with improved reliability and productivity. The disclosed variable capacitor is described with reference to FIGS. 2A, 2B. FIG. 2A is a schematic perspective diagram of the variable capacitor, and FIG. 2B is a schematic configuration diagram thereof.

The variable capacitor 100 disclosed in the publication includes a cubic dielectric layer 104 with four surfaces, each of which includes a terminal formed thereon as shown in FIGS. 2A, 2B. Two of the four terminals are signal terminals 103 connected to the internal signal electrodes whereas the remaining two are control terminals 102 connected to the internal control electrodes. The internal structure of the variable capacitor 100 is configured such that pluralities of signal electrodes and control electrodes are alternately provided via the dielectric layer 104 in a layered manner as shown in FIG. 2B. In the example of FIG. 2B, control electrodes 102a indicate the bottom-layer electrode, the fifth-layer electrode from the bottom, and the top layer-electrode each connected to one of the control terminals 102 whereas control electrodes 102b indicate the third-layer electrode from the bottom, and the seventh-layer electrode from the bottom each connected to the other control terminal 102. Further, signal electrodes 103a indicate the second-layer electrode from the bottom, and the sixth-layer electrode from the bottom each connected to one of the signal terminals 103 whereas signal electrodes 103b indicate the fourth-layer electrode from the bottom, and the eighth-layer electrode from the bottom each connected to the other signal terminal 103.

In the related art example of the variable capacitor, the capacitance thereof can be increased at low cost by providing the plurality of signal electrodes 103a, 103b, and the plurality of control electrodes 102a, 102b via the dielectric layer 104 in a layered manner, while the voltage can be independently applied to the control terminals 102 and signal terminals 103.

As described above, it is easy to fabricate the variable capacitor 100 at low cost by providing the plurality of control electrodes 102a, 102b and the plurality of signal electrodes 103a, 103b via the dielectric layer 104 in a layered manner. However, the signal capacitance between the signal terminals 103, and the control capacitance between the control terminals 102 are, as shown by C1 to C8 in FIG. 2B, created in the same direction in the dielectric layer 104. In this case, the signal electric field and control electric field is generated in the same directions.

Thus, in the related art variable capacitor 100, when thin dielectric layers are provided to increase the sensitivity of the electric field so as to change the capacitance value by the application of low control voltage, an insulating property decreases and lower pressure resistance to the signal voltage.

Specifically, the signal electric field is generated in parallel with the control electric field so that the signal capacitance created between the signal terminals 103 and the control capacitance created between the control terminals include the same capacitance. In this case, there is a reciprocal relationship between lowering the control voltage and increasing the pressure resistance to the signal voltage in the variable capacitor. Accordingly, it may be difficult to control the capacitance of the related art variable capacitor 100 by applying low control voltage while applying signal voltage with large amplitude.

SUMMARY OF THE INVENTION

Embodiments of the invention have attempted to provide a variable capacitor capable of setting the sensitivity of the electric field for control voltage regardless of pressure resistance to signal voltage, and an electric device utilizing such a variable capacitor.

A variable capacitor according to an embodiment of the invention includes signal electrodes configured to sandwich a dielectric layer so as to generate a signal electric field, and control electrodes configured to sandwich the dielectric layer so as to generate a control electric field in a direction intersecting with the signal electric field generated between the signal electrodes.

In the variable capacitor according to the embodiment, a capacitance value of signal capacitance created between the signal electrodes will vary with a capacitance value of control capacitance changed by the control electric field that is generated in the direction intersecting with the signal electric field. In this variable capacitor, since the control electric field intersects with the signal electric field, signal terminals and control terminals can be designed to each have independent pressure resistance.

An electronic device according to an embodiment of the invention includes a power supply, and a variable capacitor including control electrodes configured to sandwich the dielectric layer so as to generate a control electric field in a direction intersecting with the signal electric field generated between the signal electrodes.

In the electronic device having the variable capacitor according to an embodiment of the invention, a capacitance value between the signal electrodes is changed by applying control voltage between the control electrodes.

In the variable capacitor according to an embodiment of the invention, three major elements for determining the capacitance thereof, namely, relative dielectric constant, an area of forming the electrode and an inter-electrode distance can be set independently based on the control capacitance created between the control electrodes, and the signal capacitance created between the signal electrodes. The variable capacitor can be designed such that the pressure resistance to the signal electrode and the pressure resistance to the control electrode can be set independently in the aforementioned manner.

In the electronic device according to an embodiment of the invention, since sensitivity of the control electric field between the control terminals can be set regardless of the pressure resistance to the signal terminals, the variable capacitor mounted on an electronic device to which high signal voltage is applied can be controlled by the application of low control voltage.

BRIEF DESCRIPTION OF THE DRAWINGS

FIGS. 12A, 12B are a schematic cross-sectional configuration diagram of the variable capacitor and a plan configuration diagram of an internal signal electrode layer according to a fourth embodiment of the invention.

FIGS. 16A, 16B are each a schematic cross-sectional perspective diagram of the variable capacitor according to other modifications of the fourth embodiment of the invention.

DESCRIPTION OF THE PREFERRED EMBODIMENTS

Embodiments of the invention will be described below with reference to FIGS. 3A, 3B to FIG. 18.

[First Embodiment]

Figure 1:
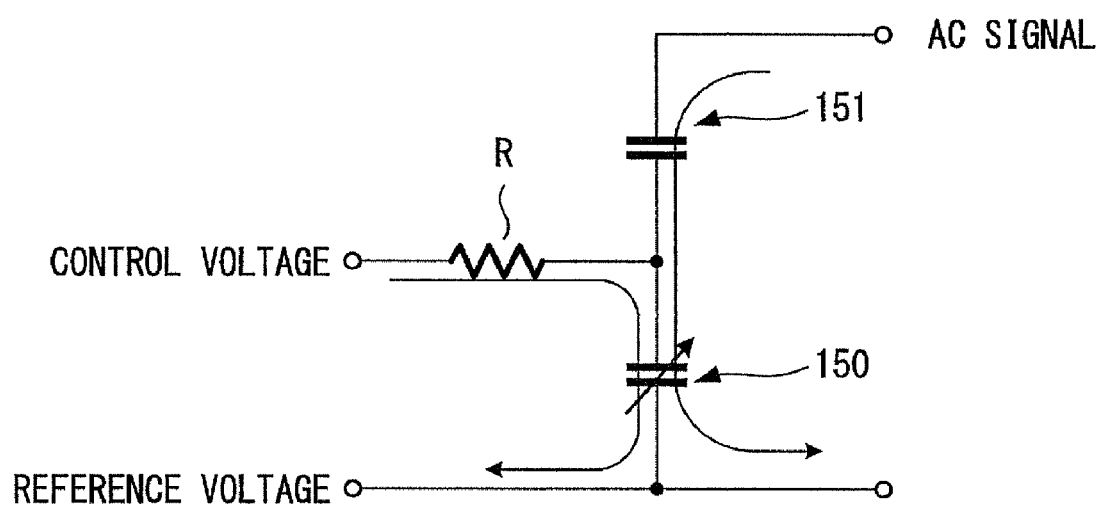
FIG. 1 is an equivalent circuit utilizing a related art variable capacitor.
Figure 2A:
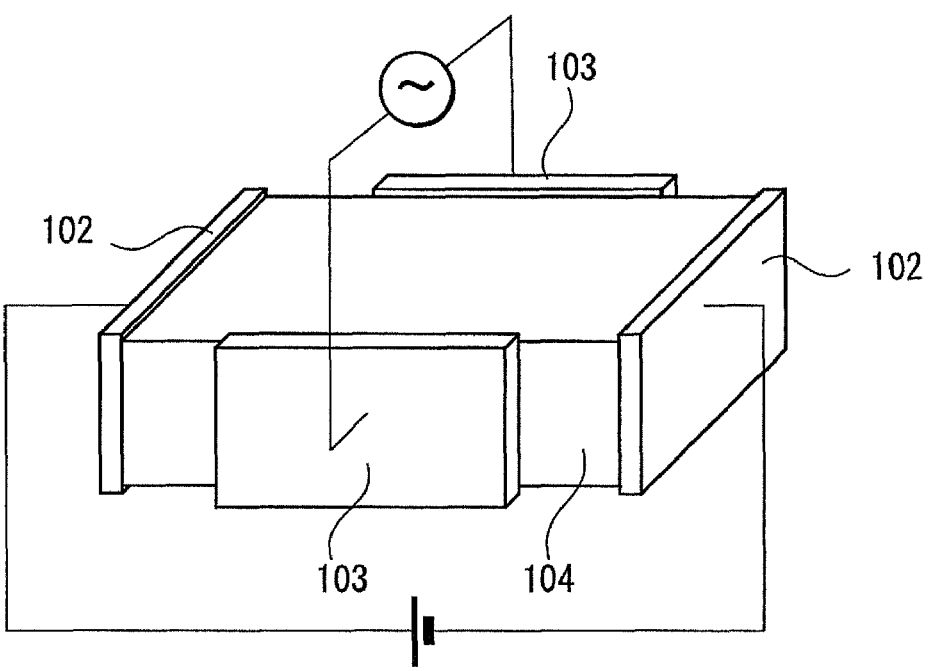
FIGS. 2A, 2B are a schematic perspective diagram of the related art variable capacitor and a cross-sectional configuration diagram thereof.
Figure 2B:
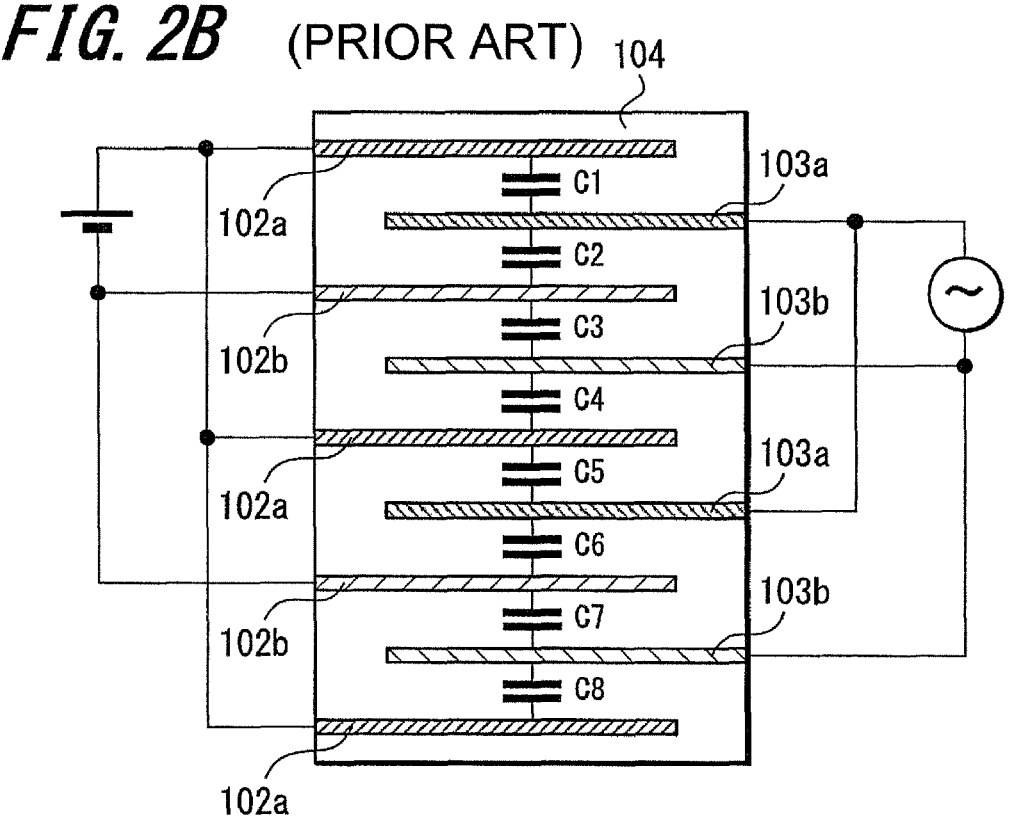
Figure 3A:
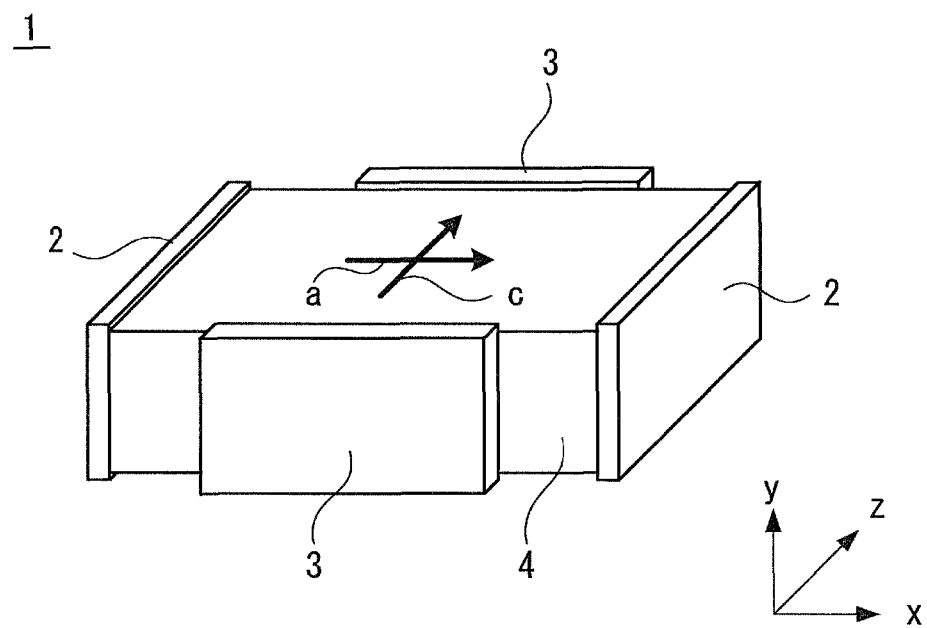
FIGS. 3A, 3B are respectively a schematic perspective diagram of a variable capacitor and a cross-sectional configuration diagram thereof according to a first embodiment of the invention.
Figure 3B:
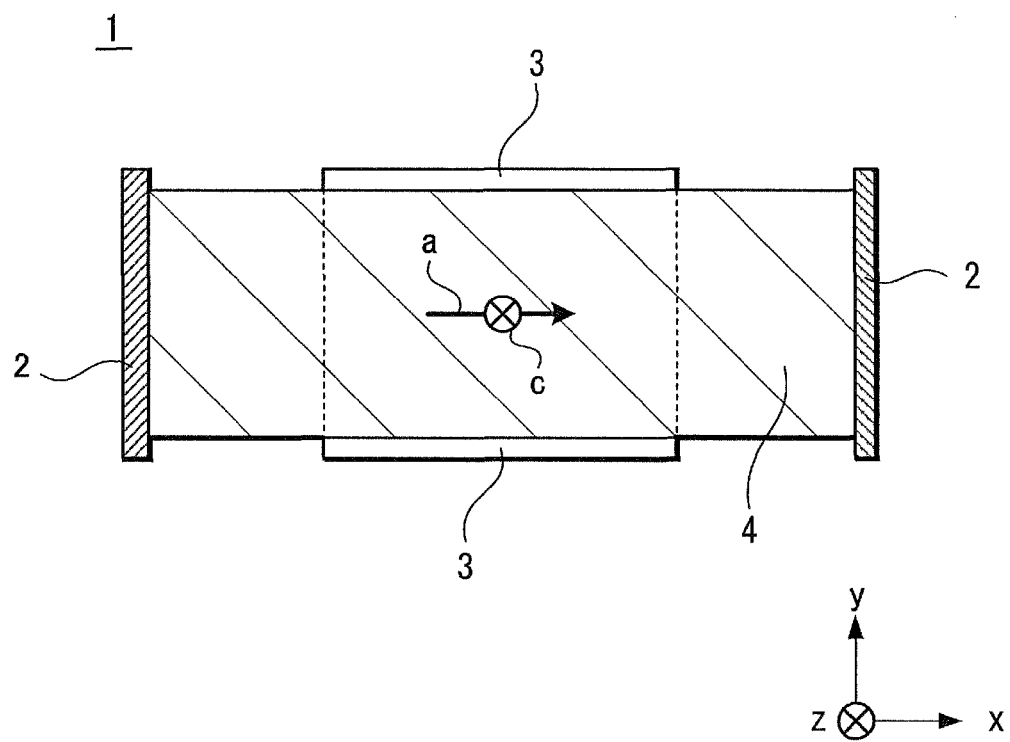

FIGS. 3A, 3B are respectively a schematic perspective diagram of a variable capacitor and a cross-sectional configuration diagram thereof according to a first embodiment of the invention.

A variable capacitor 1 according to the first embodiment of the invention is configured to include a dielectric layer 4 formed in a rectangular parallelepiped shape, four faces of which include respective four terminals. In FIGS. 3A, 3B, an x-axis, y-axis, and z-axis respectively indicate a horizontal direction from left to right, a vertical direction from bottom to top, and a depth direction from front to back of the variable capacitor 1 represented in the plane of the drawing sheet.

Examples of the material used for the dielectric layer 4 include ionic polarized and electronically polarized ferroelectric materials. The ionic polarized ferroelectric material is formed of ionic crystalline materials, and is electrically polarized by atomic displacements between positive and negative ions in ionic crystals. The ionic polarized ferroelectric material includes a perovskite structure shown by a chemical formula $ABO_3$ (atom A, atom B). Examples of such a material include $BaTiO_3$ (barium titanate), $KNbO_3$ (potassium niobate), and $PbTiO_3$ (lead titanate). PZT used in the embodiment is a ferroelectric material formed by mixing $PbTiO_3$ (lead titanate) with $PbZrO_3$ (lead zirconate).

The electronically polarized ferroelectric material exhibits polarization resulted from electric dipole moments due to non-uniform distributions of positive and negative charges (on the various atoms). Recently, there has been proposed a rare-earth ferrioxide material exhibiting ferroelectricity, in which polarization is formed by including a $Fe^{2+}$ charge-face and a $Fe^{3+}$ charge-face. This type of materials exhibits a high dielectric constant and is shown by the following molecular formula: $(RE) \cdot (TM)_2 \cdot O_4$ wherein (RE) represents rare earth, and (TM) represents a iron group. Examples of (RE) include Y, Er, Yb, and Lu, of which Y and heavy rare-earth elements are particularly preferable, whereas examples of (TM) include Fe, Co, and Ni, of which Ni is particularly preferable. Examples of (RE)·(TM)$_2$·O$_4$ include ErFe$_2$O$_4$, LuFe$_2$O$_4$, and YFe$_2$O$_4$.

In the variable capacitor 1 according to the first embodiment, planar control terminals 2 are formed on y·z mutually-faced surfaces of the rectangular parallelepiped dielectric layer 4 whereas planar signal terminals 3 are formed on x·y mutually-faced surfaces of the rectangular parallelepiped dielectric layer 4. In addition, the signal terminal 3 and control terminal 2 are formed on the dielectric layer 4 so as not to be brought in contact with each other.

In the variable capacitor 1 according to the first embodiment, the signal terminal 3 also has capability of a signal electrode, and the control terminal 2 has capability of a control electrode.

Specifically, in the variable capacitor 1 configured in the aforementioned manner, the planar control terminals 2 formed on the y·z surfaces are used as the control electrodes to create control capacitance between the control terminals 2. In this case, the control electric field is generated in an x-direction as indicated by an arrow "a". Likewise, the planar signal terminals 3 formed on the x·y surfaces are used as the signal electrodes to create signal capacitance between the signal terminals 3, which intersects at right angles with the control electrodes 2. In this case, the signal electric field is generated in a z-direction as indicated by an arrow "c". In other words, the variable capacitor according to the first embodiment is configured such that the direction of the control electric field and the signal electric field intersect at right angles with each other.

In the variable capacitor according to the first embodiment, the capacitance of the control capacitance can be controlled by control voltage (DC voltage) applied between the control terminals 2. The application of control voltage between the control terminals 2 changes the capacitance value of the signal capacitance created between the signal terminals 3 in compliance with the capacitance value of the control capacitance, and when AC signal is transmitted between the signal terminals, the variable capacitor 1 functions as a capacitor having the controlled signal capacitance.

In the variable capacitor according to the first embodiment, the signal terminals 3 are provided on the x·y surfaces of the dielectric layer 4 whereas the control terminals 2 are provided on the y·z surfaces thereof; however, the signal terminals 3 and the control terminals 2 may be placed vice versa. Alternatively, either the signal terminals 3 or the control terminals 2 may be provided on the y·z surfaces of the dielectric layer 4. That is, the signal terminals 3 and control terminals 2 can be arranged such that the control electric field and the signal electric field intersect with each other. In the variable capacitor according to the first embodiment, the dielectric layer 4 is formed in a rectangular parallelepiped shape, so that the control electric field and the signal electric field intersect at right angles with each other. However, the control electric field and the signal electric field may not have to intersect at right angles but only to intersect with each other.

Figure 4A:
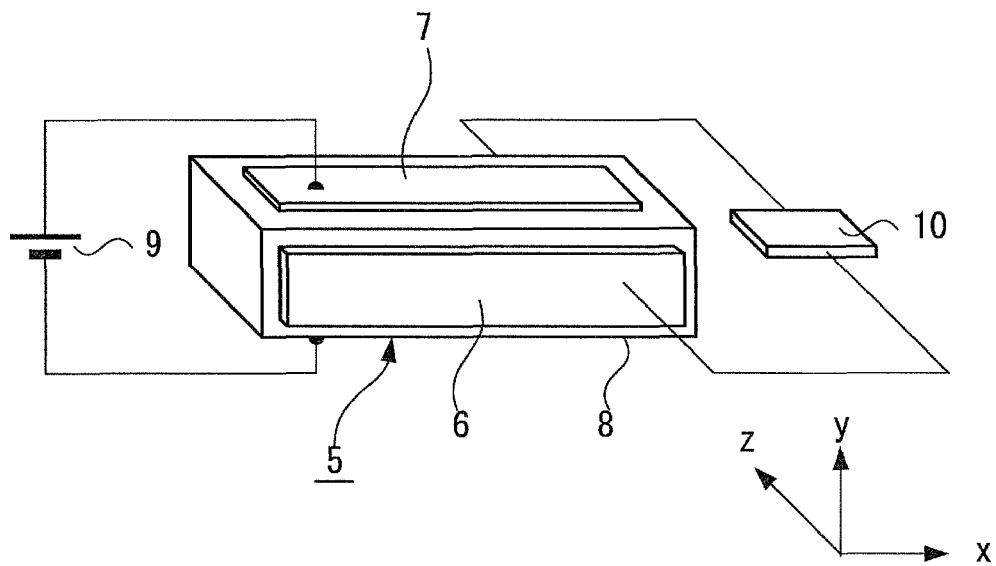
FIGS. 4A, 4B are a schematic configuration diagram of a specimen used in an experiment and a cross-sectional configuration diagram thereof.
Figure 4B:
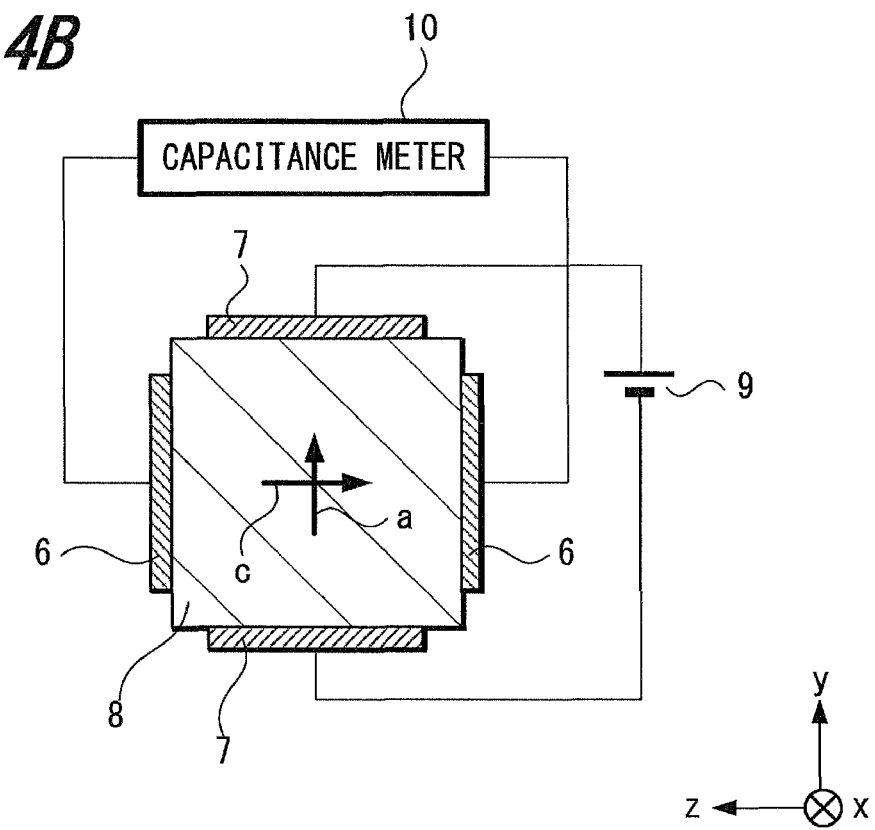
Figure 5:
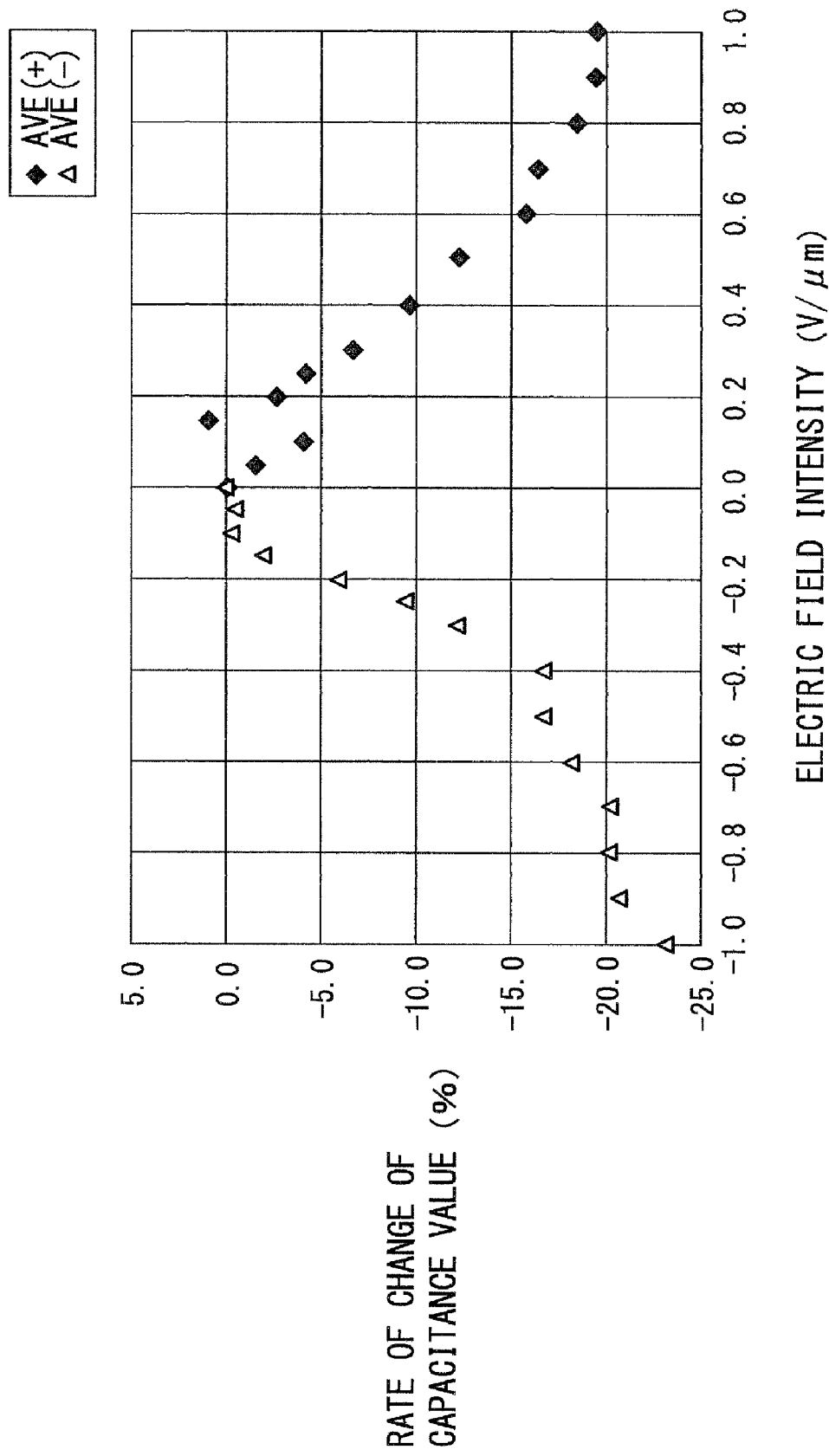
FIG. 5 is a graph showing measured values obtained in the experiment.

An experiment was carried out using a specimen shown in FIGS. 4A, 4B to measure properties of the variable capacitor, in which the signal electric field and control electric field intersect with each other, and results obtained were represented on the graph FIG. 5. FIG. 4A is a schematic perspective diagram of the specimen 5, and FIG. 4B is a schematic cross-sectional configuration diagram of the specimen 5 sectioned in a z-axis direction.

As shown in FIG. 4A, the specimen 5 used in the experiment was a variable capacitor including a dielectric layer 8 with a length in an x-axis direction of about 30 mm, and lengths in y-direction and in z-direction of about 0.5 mm. In the variable capacitor, control terminals 7 were formed on x·z surfaces of the dielectric layer 8, and signal terminals were formed on x·y surfaces of the dielectric layer. The dielectric layer 8 of the specimen 5 was made of lead zirconium titanate (PZT), which was one example of a ferroelectric material. In the specimen 5, control terminals 7 and signal terminals 6 were formed on the dielectric layer 8 so as not to be brought in contact with each other. The control terminals 7 and signal terminals 6 were also used as control electrodes and signal electrodes, respectively, in order to form a capacitor. Nickel plating was used for forming the signal terminals 6 and control terminals 7.

In the specimen 5, a desired DC voltage of 9 V was applied between the control terminals 7 to generate control electric field in the direction of an arrow "a". A capacitance meter 10 was placed between the signal terminals 6 to measure rates of capacitance values. Note that the signal electric field is generated between the signal terminals 6 in the direction of an arrow "c".

In the graph shown in FIG. 5, a horizontal axis indicates electric field intensity obtained upon application of DC voltage of 9 V whereas a vertical axis indicates rate of change of capacitance values measured between the signal terminals 6. The rate of change of capacitance values is measured based on 1 nF as a reference value. In FIG. 5, a measured value AVE(+) was obtained upon application of DC voltage in a positive polarity whereas a measured value AVE(−) was obtained upon application of DC voltage in a negative polarity. As can be clear from FIG. 5, when a capacitance value of the specimen 5 was changed by causing the control electric field to be generated between the control terminals 7, a capacitance value obtained in an intersecting direction, that is, a capacitance value measured between the signal terminals 6 was also changed. Specifically, when a variable capacitor is configured such that the control electric field intersects with the signal electric field, a capacitance value created between the signal terminals 6 can be controlled by changing a capacitance value created between the control terminals 7.

The change of the capacitance value results from change of the dielectric constant due to the change in polarization state of the dielectric layer. That is, the polarization changed with the direction of the control electric field can affect change of the capacitance value between the signal terminals 6, i.e., change of the dielectric constant between the signal terminals 6. In the variable capacitor 1 according to the first embodiment shown in FIGS. 3A, 3B, the signal capacitance value obtained between the signal terminals 3 can be changed by applying the control voltage between the control terminals 2.

An anisotropic dielectric material is a material, dielectric constant of which is determined according to the direction thereof. For example, in FIGS. 3A, 3B, when an anisotropic dielectric material is used for the dielectric layer 4, larger effect of the polarization changed by the generation of control electric field is provided on the change of the capacitance value between the signal terminals 3. In this case, the value of the signal capacitance can significantly be changed by applying a DC voltage, that is, low control voltage between the control terminals 2.

In the variable capacitor according to the first embodiment, since the control terminals and the signal terminals are independently formed, and the control electric field and signal electric field intersect with each other, signals transmitted between the control terminals will not leak into the signal terminals. Thus, the bias eliminating capacitor (for eliminating DC voltage) used in the related art variable capacitor may no longer be necessary.

[Second Embodiment]

Figure 6A:
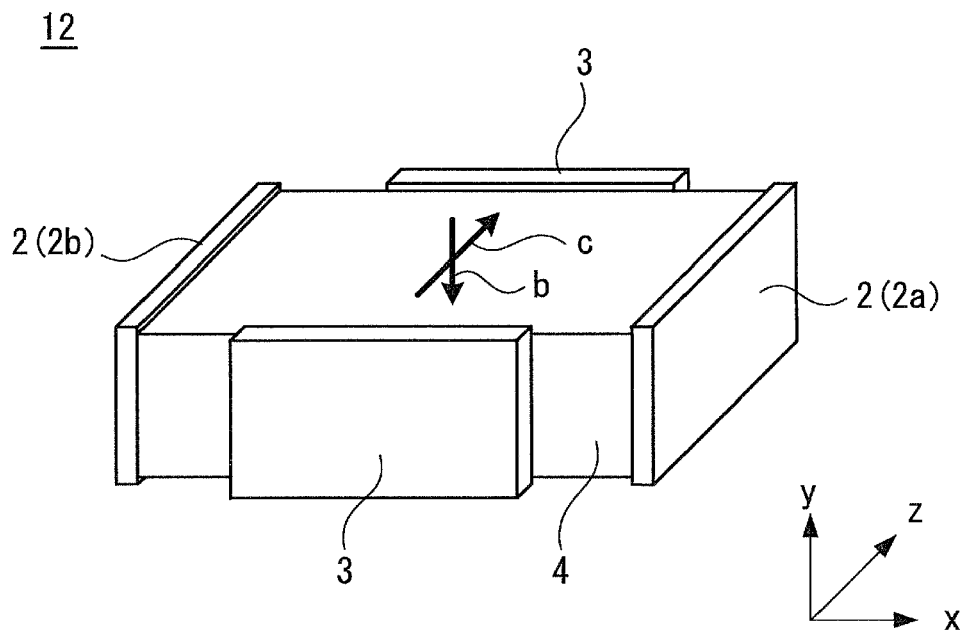
FIGS. 6A, 6B are a schematic perspective diagram of the variable capacitor and a cross-sectional configuration diagram thereof according to a second embodiment of the invention.
Figure 6B:
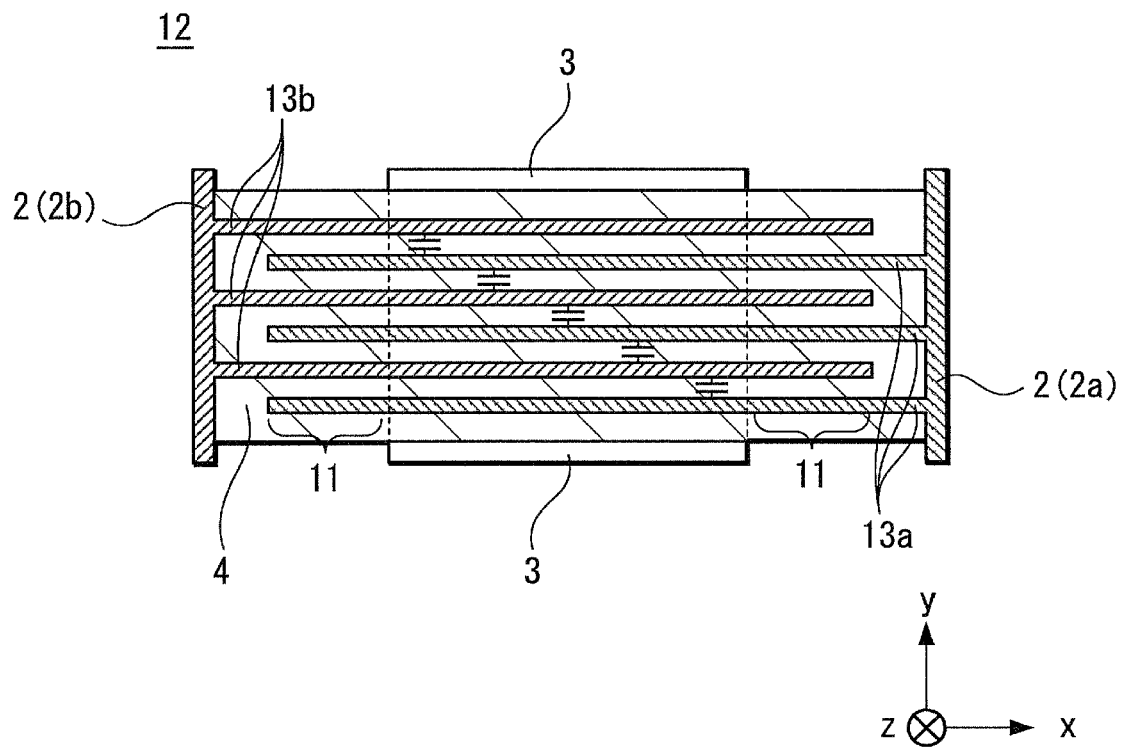

FIGS. 6A, 6B are a schematic perspective diagram of the variable capacitor and a cross-sectional configuration diagram thereof according to a second embodiment of the invention. In FIGS. 4A, 4B, an x-axis, y-axis, and z-axis respectively indicate a horizontal direction from left to right, a vertical direction from bottom to top, and a depth direction from front to back of a variable capacitor 12 represented in the plane of the drawing sheet.

In FIGS. 4A, 4B, the same reference numerals are provided to elements corresponding to those shown in FIGS. 3A, 3B, and duplicated descriptions thereof are omitted.

The variable capacitor 12 according to the second embodiment includes a dielectric layer 4 having pluralities of internal control electrodes 13a, 13b connected to control terminals 2. The internal control electrodes 13a, 13b are extendedly formed with planar shapes in an x·z surface direction, and six layers thereof are provided via the dielectric layer 4 in a layered manner. As shown in FIG. 6B, first, third, fifth internal control electrodes 13a formed from the bottom are connected with first control terminals 2a whereas second, fourth, sixth internal control electrodes 13b are connected with second control terminals 2b in the variable capacitor 12 according to the second embodiment.

Figure 7:
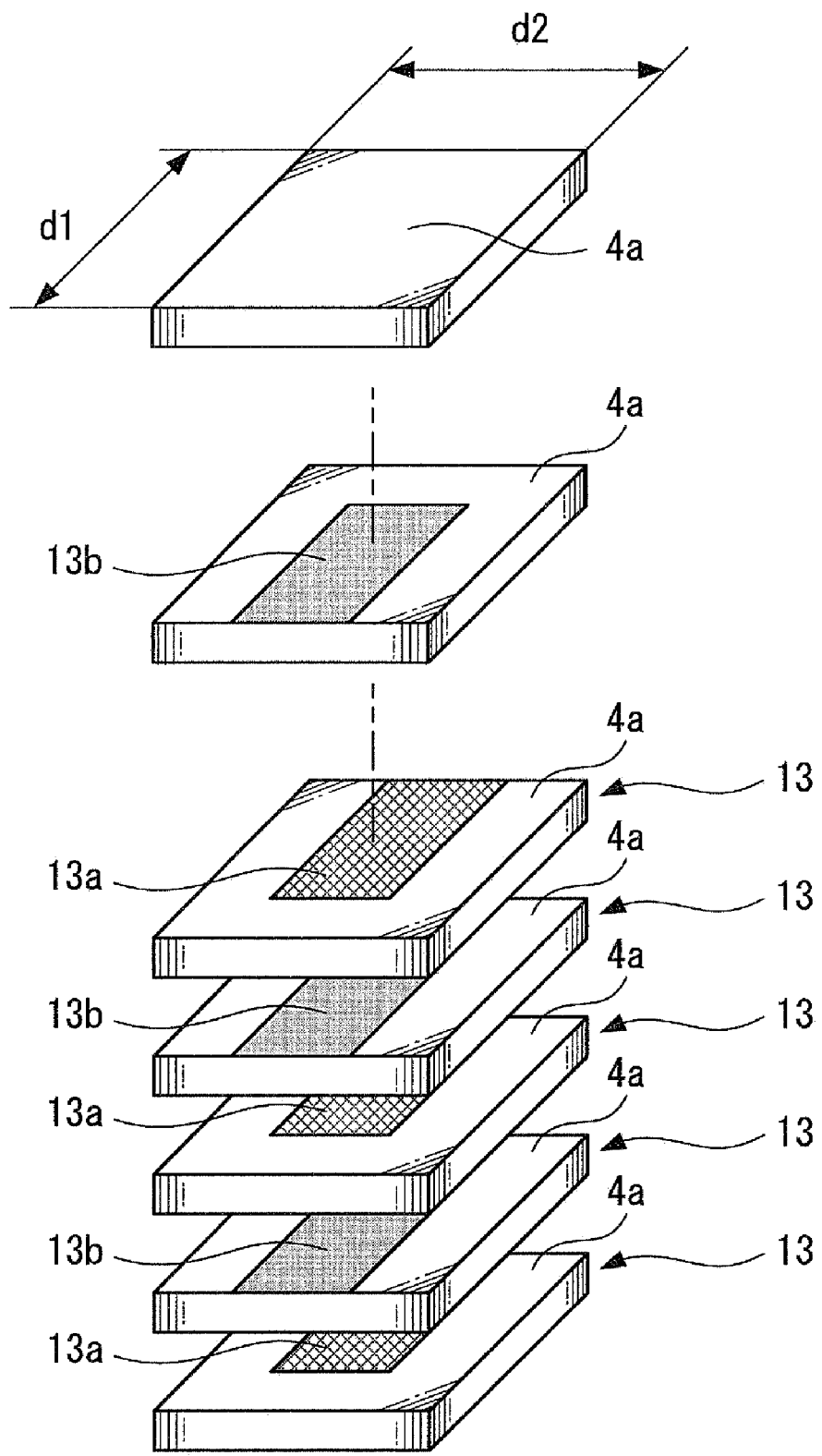
FIG. 7 is an exploded perspective diagram (part I) of the variable capacitor in a fabrication stage according to the second embodiment of the invention.

The variable capacitor 12 is, as illustrated in FIG. 7, formed by providing internal control electrode layers 13 in a layered manner, which are fabricated by printing the internal control electrodes 13a, 13b made of metallic paste on planer ceramic green sheets 4a that are used as the dielectric layer 4. A width d1 indicates a distance between the control terminals 2, and a width d2 indicates a distance between the signal terminals 3 of the ceramic green sheet 4a. Since first ends of the internal control electrodes 13a, 13b are used as extraction electrodes of the control terminals 2, the first ends of the internal control electrodes 13a, 13b are formed to be exposed from the ends of the ceramic green sheets 4a. The internal control electrode layers 13 are layered such that the exposed extraction electrodes formed thereon are alternately arranged at the opposite side to one another.

Figure 8:
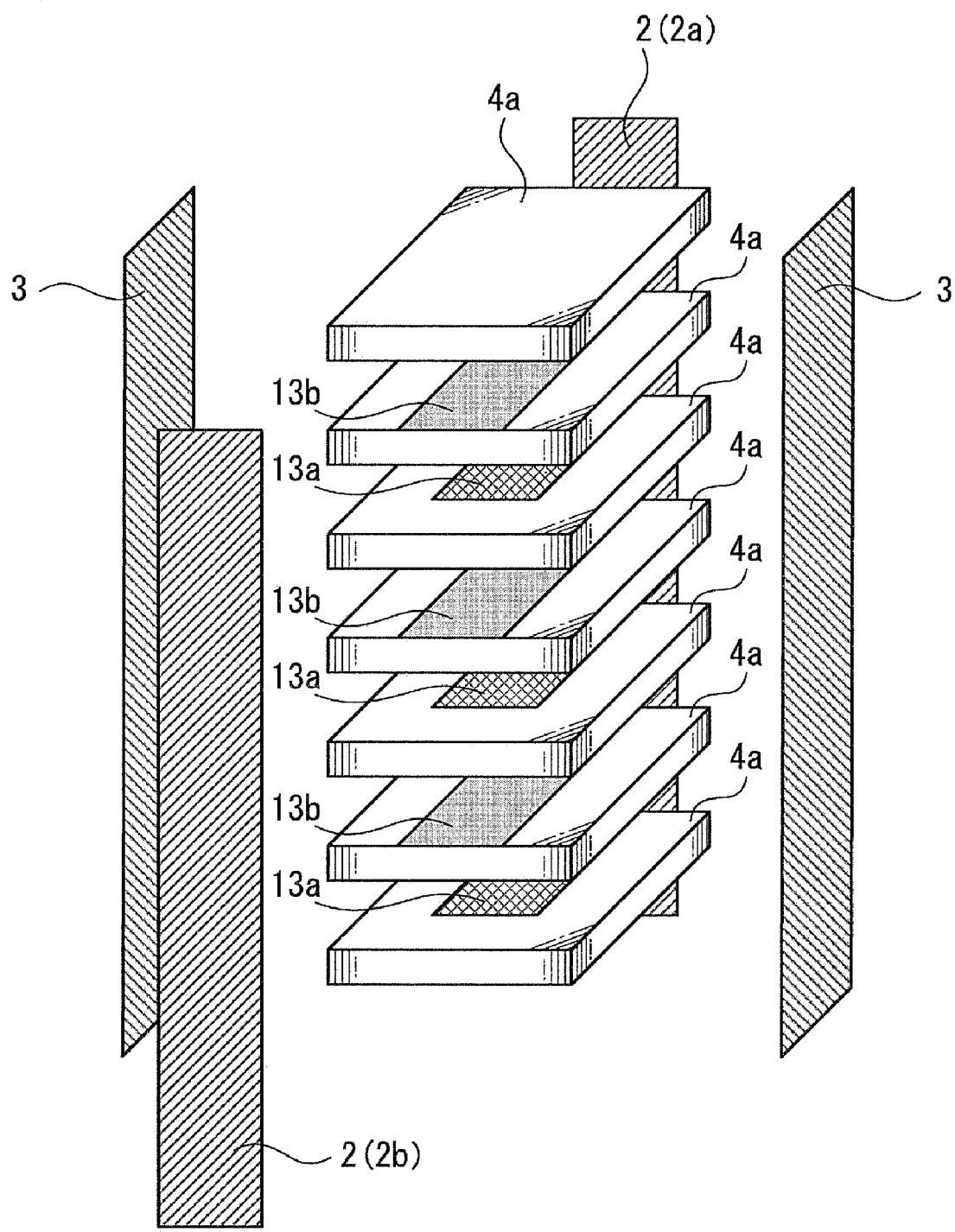
FIG. 8 is an exploded perspective diagram (part II) of the variable capacitor in the fabrication stage according to the second embodiment of the invention.

Further, protective ceramic green sheets are provided above and under each internal control electrode layer 13, and then sintered, for example, at a high temperature of 1300° C. Thereafter, the signal terminals 3 and the control terminals 2 are connected with desired side surfaces of a body of the internal control electrode layers 13, thereby obtaining a complete product of the variable capacitor 12 as illustrated in FIG. 8. At this point, the control terminal 2a is formed so as to be in contact with an extraction electrode formed at the end of the internal control electrode 13a whereas the control terminal 2b is formed to be in contact with an extraction electrode formed at the end of the internal control electrode 13b.

In the variable capacitor 12 having such a configuration, control capacitance is created between adjacent internal control electrodes 13a, 13b by applying voltage between the control terminals 2. There is a vertical relationship between y·z planar surfaces on which the control terminals are formed and planar surfaces on which internal control electrodes 13a, 13b that generates the control electric field at the control capacitance. Capacitance having such a positional relationship is defined as a "vertical capacitor" in the description below.

Since the variable capacitor 12 according to the second embodiment includes the internal control electrodes 13a, 13b, the control electric field is generated in a y-direction as shown by an arrow "b". Further, since the signal terminals 3 are formed on x·y plane surfaces, the signal electric field is generated in a z-direction as shown by an arrow "c", which is a direction perpendicular to the control electric field.

In the variable capacitor 12 according to the second embodiment, the control capacitance of the vertical capacitor is created by forming the internal control electrodes 13a, 13b. However, since there is an intersecting relationship in directions between the control electric field and signal electric field, the variable capacitor 12 according to the second embodiment can exhibit the same effects as those obtained in the first embodiment.

Moreover, since it is possible to decrease a distance between the electrodes easily by forming the internal control electrodes 13a, 13b in the variable capacitor 12 according to the second embodiment, the variable capacitor 12 can be configured such that the electric field intensity of control electric field is greater than that of signal electric field. Thus, the control voltage for changing the capacitance value can be lowered. In this case, the configurations of the internal control electrodes 13a, 13b may also not be affected so much by the configurations of the signal terminals 3 or the distance between the signal terminals 3. Accordingly, the pressure resistances of the signal terminals 2 can be maintained even when the internal control electrodes 13a, 13b connected to the control terminals 2 are modified to include the vertical capacitor such that the capacitance value can be changed by the application of low control voltage.

The variable capacitor 12 according to the second embodiment includes six layers of the internal control electrodes 13a, 13b; however, the variable capacitor 12 is not limited thereto. The variable capacitor 12 may includes the desired number of layers of the internal control electrodes 13a, 13b. Alternatively, a plurality of the variable capacitors 12 can be layered, with the variable capacitor 12 shown in FIGS. 6A, 6B to FIG. 8 being configured as a basic unit.

The variable capacitor 12 according to the second embodiment can increase an effective region of the control electric field by changing patterns of the internal control electrodes 13a, 13b. That is, when areas of adjacent internal control electrodes 13a, 13b are enlarged, mutually overlapping areas between the internal control electrodes 13a, 13b will increase, thereby increasing areas in which the control electric field is generated. However, the control capacitance increases with the increase of such areas, thereby resulting in poor response. The control electric field may need regions in which the signal electric field is generated. Thus, the control capacitance can be reduced by eliminating regions 11 of the internal control electrodes 13a, 13b in which the signal electric field is not be generated, and which may not affect any control of the signal electric field as shown in FIG. 6B.

[Third Embodiment]

Figure 9A:
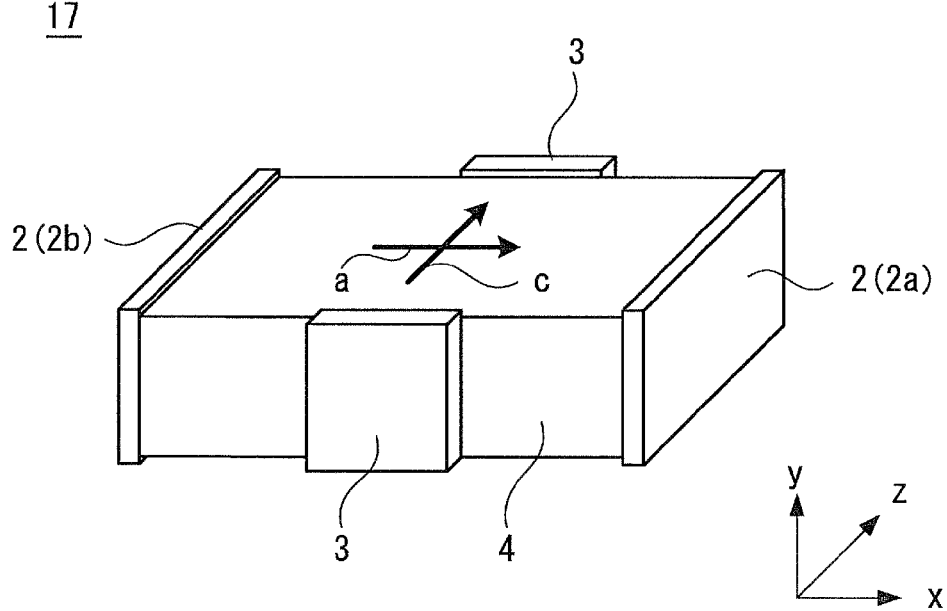
FIGS. 9A, 9B are a schematic perspective diagram of the variable capacitor and a cross-sectional configuration diagram thereof according to a third embodiment of the invention.
Figure 9B:
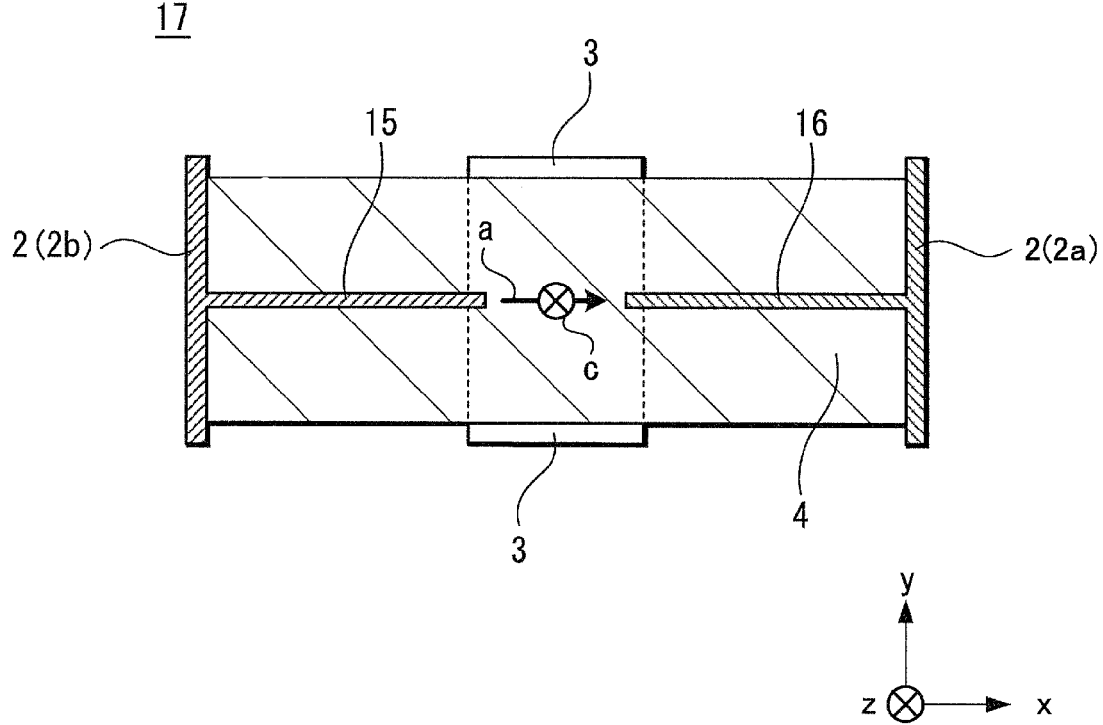

FIGS. 9A, 9B are a schematic perspective diagram of a variable capacitor and a cross-sectional configuration diagram thereof according to a third embodiment of the invention. In FIGS. 9A, 9B, an x-axis, y-axis, and z-axis respectively indicate a horizontal direction from left to right, a vertical direction from bottom to top, and a depth direction from front to back of a variable capacitor 17 represented in the plane of the drawing sheet.

In FIGS. 9A, 9B, the same reference numerals are provided to elements corresponding to those shown in FIGS. 3A, 3B, and duplicated descriptions thereof are omitted.

The variable capacitor 17 according to the third embodiment includes a dielectric layer 4 having two internal control electrodes 15, 16 connected to control terminals 2. The internal control electrode 16 is connected to a first control electrode 2a whereas the internal control electrode 15 is connected to a second control electrode 2b. The planer internal control electrodes 15, 16 are provided in parallel with an x·z-surface at the center in a y-axis direction of a dielectric layer 4. The two internal control electrodes 15, 16 are provided with a gap having a width w1 (hereinafter called "gap length w1") therebetween in an x-axis direction. The signal terminals 3 are formed on the x·y planer surfaces of the dielectric layer 4 so as to overlap the gap length w1.

In the variable capacitor 17 according to the third embodiment, the signal electric field is generated in a z-direction indicated by an arrow "c" whereas the control electric field is generated in the an x-direction indicated by an arrow "a". Thus, since there is an intersecting relationship in directions between the control electric field and signal electric field, the variable capacitor 17 of the third embodiment can also exhibit the same effects as those obtained in the first embodiment.

In the variable capacitor 17 according to the third embodiment, the control capacitance is created between two internal control electrodes 15, 16, the capacitance value of the dielectric layer 4 at the gap length w1 is varied with the control voltage (DC voltage) applied between the control terminals 2.

In the variable capacitor 17 according to the third embodiment, the capacitance created in the same plane on which the internal control electrodes 15, 16 are formed, is defined as a horizontal capacitor. A distance between the signal terminals 3 is defined as a gap length w2 in the third embodiment.

Since the variable capacitor 17 according to the third embodiment includes the internal control electrodes 15, 16 connected to the control terminals 2 that form a horizontal capacitor, the control electric field is applied to the dielectric layer 4 in the horizontal capacitor, thereby changing the capacitance value of the horizontal capacitor. In the variable capacitor 17 according to the third embodiment, the control voltage for changing the capacitance value can be lowered by decreasing the gap length w1 between the internal control electrodes 15, 16 that form the horizontal capacitor. In this case, the gap length w2 between the signal terminals 3 may not need changing. Thus, the pressure resistance between the signal terminals 3 can be retained.

Specifically, in the variable capacitor 17 according to the third embodiment, the gap length w1 can optionally be configured by creating the horizontal capacitor by providing the internal control electrodes 15, 16 in the dielectric layer 4. Thus, the sensitivity of electric field to the control voltage can be set regardless of the magnitude of pressure resistance to the signal voltage.

For example, if the gap length w1 between the internal control electrodes 15, 16 connected to the control terminals 2 is set to 2 μm, the gap length w2 between the signal terminals 3 can be set to from 200 to 300 μm. It may be structurally difficult to fabricate a variable capacitor having an aspect ratio where the gap length between the signal terminals 3 is 200 to 300 μm, and the gap length between the control terminals 2 is 2 μm. However, the aspect ratio of the gap lengths w1 and w2 can optionally be designed by forming the internal control electrodes 15, 16 of the variable capacitor according to the third embodiment. Further, since magnitude of pressure resistance to the signal terminals is proportional to the gap lengths, and magnitude of control voltage is also proportional to the gap lengths, the variable capacitor according to the third embodiment can control the capacitance value by applying low control voltage while maintaining the pressure resistance to the signal voltage.

Specifically, in the variable capacitor of the third embodiment, the control voltage can be lowered approximately to 1/100 to 1/300 of the signal voltage. For example, if a device, to which the signal voltage of 3000 V is applied, is provided with the variable capacitor of the related art, approximately 1/4 to 1/6 of the signal voltage may be required as control voltage in order to control the capacitance value. However, if a device, to which the signal voltage of 3000 V is applied, is provided with the variable capacitor 17 according to the third embodiment, the variable capacitor 17 can be controlled by applying the control voltage of about 10 V.

Figure 10A:
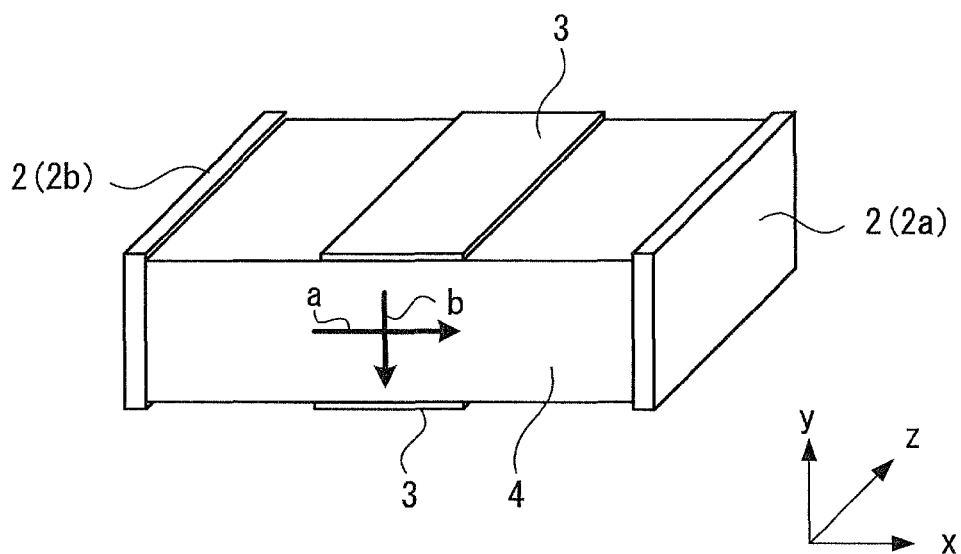
FIGS. 10A, 10B are a schematic perspective diagram of the variable capacitor and a cross-sectional configuration diagram thereof according to another modification of the third embodiment of the invention.
Figure 10B:
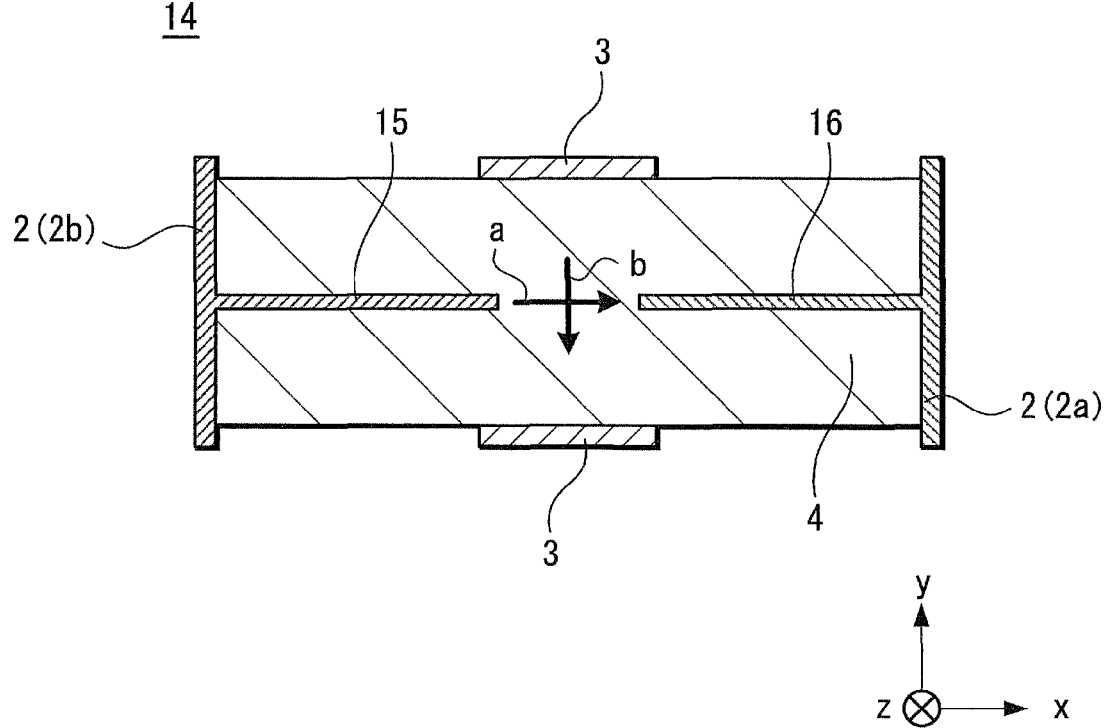

In the variable capacitor according to the third embodiment, the signal terminals 3 are formed on two x·y planer surfaces of the dielectric layer 4; however, the signal terminals 3 may alternatively be formed on two x·z planer surfaces of the dielectric layer 4 as shown in FIGS. 10A, 10B. In FIGS. 10A, 10B, the same reference numerals are provided to elements corresponding to those shown in FIGS. 9A, 9B, and duplicated descriptions thereof are omitted.

FIGS. 10A, 10B shows a variable capacitor 14 according to the third embodiment, in which the signal electric field is generated between the signal terminals 3 in a y-axis direction as indicated by an arrow "b". In this case, the control electric field is generated between the control terminals 2 in an x-direction as indicated by an arrow "a". Accordingly, when the internal control electrodes 15, 16 connected to the control terminals 2 form the horizontal capacitor, and simultaneously, the signal terminals 3 are formed on x·z planer surfaces of the dielectric 4, the control electric field and signal electric field mutually intersect at right angles. The signal terminals 3 are formed on the x·z planer surfaces of the dielectric layer 4 so as not to be overlapped with the gap length w1. In this case, the variable capacitor 14 according to the third embodiment can also exhibit the same effects as those obtained in the variable capacitor 17 of the third embodiment shown in FIGS. 9A, 9B.

Figure 11A:
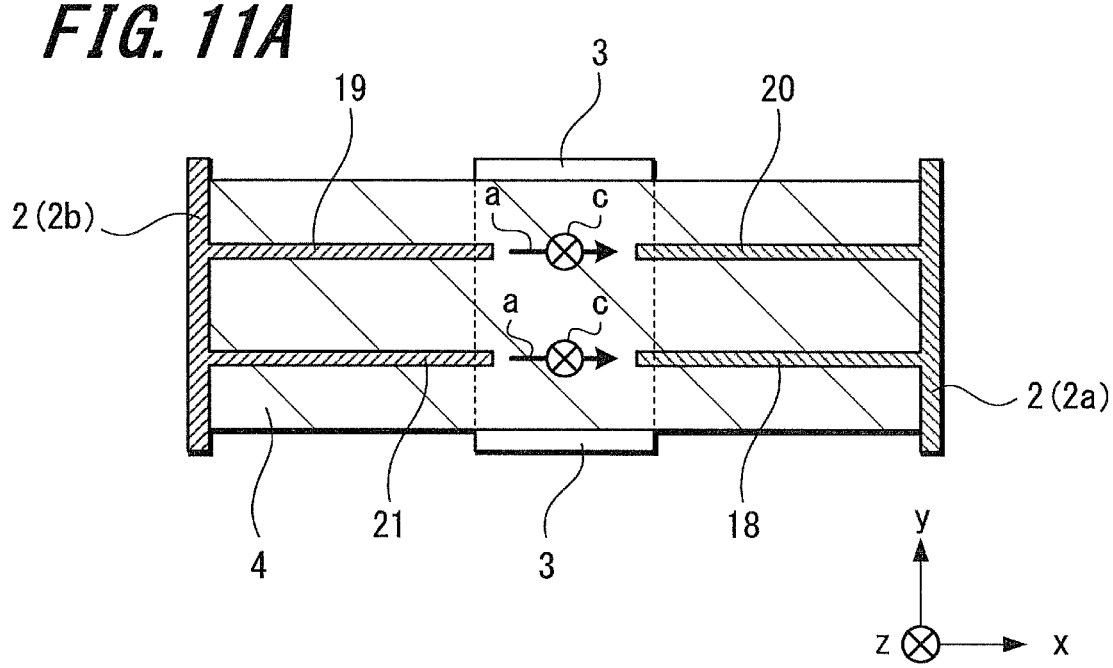
FIGS. 11A, 11B are schematic cross-sectional configuration diagrams of the variable capacitor according to another modification of the third embodiment of the invention.
Figure 11B:
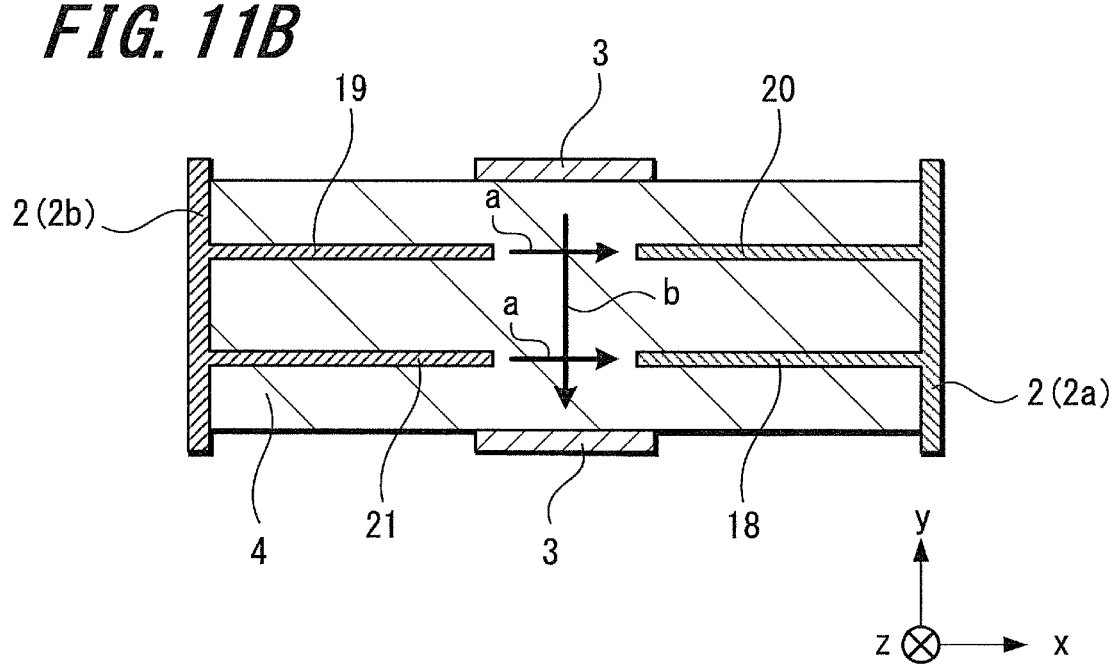

FIGS. 11A, 11B are schematic cross-sectional configuration diagrams of the variable capacitor according to another modification of the variable capacitor of the third embodiment, in which two in-plane layers, each formed of two internal control electrodes connected to the signal terminals 3, are provided. In FIG. 11A, the same reference numerals are provided to elements corresponding to those shown in FIGS. 9A, 9B, and duplicated descriptions thereof are omitted. In FIG. 11B, the same reference numerals are provided to elements corresponding to those shown in FIGS. 10A, 10B, and duplicated descriptions thereof are omitted.

FIG. 11A illustrates a modified example of the variable capacitor 17 including two in-plane layers of the internal control electrodes 15, 16 shown in FIGS. 9A, 9B. As shown in FIG. 11A, this modification includes a first layer of internal control electrodes 21, 18, and a second layer of internal control electrodes 19, 20. FIG. 11B illustrates a modified example of the variable capacitor 14 including the internal control electrodes 15, 16 shown in FIGS. 10A, 10B. As shown in FIG. 11B, this modification includes a first layer of internal control electrodes 21, 18, and a second layer of internal control electrodes 19, 20. In the variable capacitors 17, 14, the internal control electrode 18 of the first layer is connected to a first control electrode 2a whereas the internal control electrode 21 of the first layer is connected to a second control electrode 2b. Further, the internal control electrode 20 of the second layer is provided directly above the internal control electrode 18 of the first layer, and is connected to the first control terminal 2a in the same manner as the internal control electrode 18 is connected thereto. Likewise, the internal control electrode 19 of the second layer is provided directly above the internal control electrode 21 of the first layer, and is connected to the second control terminal 2b in the same manner as the internal control electrode 21 is connected thereto.

The planer internal control electrodes 21, 18 of the first layer and the planer internal control electrodes 19, 20 of the second layer are formed on an in-plane x·z surface of a dielectric layer 4. The internal control electrodes 21, 18 respectively connected to the control terminals 2b, 2a are formed with a gap having a width w1 (hereinafter called "gap length w1") therebetween in an x-axis direction. Likewise, the internal control electrodes 18, 20 respectively connected to the control terminals 2b, 2a are formed with a gap having a width w1 therebetween in an x-axis direction. In the variable capacitor according to the third embodiment, the horizontal capacitors are created between the internal control electrodes 21, 18 and are also created between the internal control electrodes 19, 20, respectively, and the capacitance value of the dielectric layer 4 at the gap length w1 is varied by the control voltage (DC voltage) applied between the control terminals 2.

Thus, the number of horizontal capacitors can be increased by providing the internal control electrodes 19, 20 of the second layer above the internal control electrodes 21, 18 of the first layer. In the examples shown in FIGS. 11A, 11B, increasing the number of horizontal capacitors can increase effective regions of control electric field; that is, increasing the number of horizontal capacitors can increase a variable amount of control capacitance. The effective regions of the control electric field can also be increased in in-plane directions by increasing the gap length w1 between the internal control electrodes 21, 18 and also between the internal control electrodes 19, 20. However, this results in an increase in the control voltage itself, due to a decrease in the electric field intensity. Insofar as enlarging the region of the control electric field in the vertical direction by increasing the number of layers of internal electrodes, the control electric field can be controlled without decreasing the electric field intensity while retaining the same control voltage.

In the examples shown in FIGS. 11A, 11B, two layers of the internal control electrodes 21, 18 and internal control electrodes 19, 20 are provided in the dielectric layer 4; however, the number of layers is not limited thereto. Arbitral number of layers of internal control electrodes may be provided in the dielectric layer 4. Further, the variable capacitor shown in FIGS. 9A, 9B, and FIGS. 11A, 11B can be fabricated in the same manner as fabricating the variable capacitor according to the second embodiment. In this method, metallic paste is printed at desired positions on planer ceramic green sheets, and the printed ceramic green sheets are then provided in layers, and the resulting ceramic green sheets are sintered to obtain the variable capacitor.

[Fourth Embodiment]

FIG. 12A is a cross-sectional configuration diagram of the variable capacitor according to a fourth embodiment of the invention. In FIG. 12A, an x-axis, y-axis, and z-axis respectively indicate a horizontal direction from left to right in the plane of the drawing sheet, a vertical direction from bottom to top, and a depth direction perpendicular to the plane of the drawing sheet.

The variable capacitor 31 according to the fourth embodiment includes dielectric layers 28 in this example, three layers, two comb-like structured internal signal electrodes 24, 25 formed on a surface of one of the dielectric layers 28 in this example, the one in the middle, an upper control electrode 26 and a lower control electrode 23 respectively formed on upper and lower surfaces of the dielectric layers 28. FIG. 12B shows a schematic plan configuration diagram of two internal signal electrodes.

The two internal signal electrodes 24, 25 are connected to signal terminals (not shown). The signal electrode 24 includes an extraction electrode portion 24b connected to a first signal terminal, and a plurality of strip-like structured internal signal electrodes 24a extended from the extraction electrode portion 24b in an in-plane direction. The signal electrode 25 is formed of an extraction electrode portion 25b connected to a second signal terminal, and a plurality of strip-like structured internal signal electrodes 25a extended from the extraction electrode portion 25b in an in-plane direction. The strip-like structured internal signal electrodes 24a, 25a of the internal signal electrodes 24, 25 are alternately arranged on the same planar surface. In the variable capacitor 31 according to the fourth embodiment, the internal signal electrodes 24, 25 are formed within an x·z planar surface in the dielectric layers 28, and the signal terminals are formed on an x·y planar surface of the dielectric layers 28.

The upper control electrode 26 is formed on an x·z planar surface of the dielectric layer 28 facing thereto, and a first end of the upper control electrode 26 is connected to a control terminal 22a formed on planar surface y·z of the dielectric layers 28. A lower control electrode 23 is formed on an x·z planar surface of the dielectric layer 28 facing thereto, and a first end of the lower control electrode 23 is connected to a control terminal 22b formed on a planar surface y·z of the dielectric layers 28.

According to the variable capacitor 31 according to the fourth embodiment, the signal terminals and control terminals 22 are provided so as not to be short-circuited with each other.

As shown in FIG. 12A, in the variable capacitor 31 according to the fourth embodiment, a horizontal capacitor that is signal capacitance C1 is created between the internal signal electrodes 24, 25 connected to the signal terminals, and a vertical capacitor that is control capacitance C2 is created between the upper control electrode 26 and lower control electrode 23 connected to the control terminals 22. In the variable capacitor 31 configured in this manner, the control electric field is also generated between the upper control electrode 26 and lower control electrode 23, and the signal electric field, which intersects with the control electric field at right angles, is generated between the internal signal electrodes 24, 25. Accordingly, the capacitance value of the control capacitance C2 is changed by applying control voltage to the control terminals 22, which subsequently changes the capacitance value of the signal capacitance C2 between the internal signal electrodes 24, 25.

As described above, the variable capacitor 31 including comb-like structured internal signal electrodes 24, 25 connected to the signal terminals can be configured such that the signal electric field and control electric field intersect at right angles. Thus, the variable capacitor 31 according to the fourth embodiment exhibits the same effects as those obtained in the first embodiment.

Further, in the variable capacitor 31 according to the fourth embodiment, a relative dielectric constant, an area of electrodes, and a distance between the electrodes can be independently designed for each of the signal capacitance C1 and control capacitance C2 by changing arrangements of the internal signal electrodes 24, 25 and the upper control electrode 26 and lower control electrode 23.

One of the advantages of arranging elements of the variable capacitor 31 such that the signal electric field and control electric field intersect at right angles is that there occurs little interference of the signal electric field with the control electric field, because the signal terminals are separately provided from the control terminals 22. However, since the internal signal electrodes 24, 25, and the upper control electrode 26 and lower control electrode 23 are all formed within in-plane x·z planar surfaces of the dielectric layers 28 as shown in FIG. 12A, redundant stray capacitance Cx is created between the upper control electrode 26 and lower control electrode 23. The redundant stray capacitance Cx will make separation of the signal terminals from the control terminals 22 incomplete. Since redundant stray capacitance Cx between the comb-like structured internal signal electrodes 24, 25 and the upper control electrode 26 and lower control electrode 23 will be more significant as the thickness of the dielectric layer 28 is decreased, some countermeasures may be required.

Figure 13A:
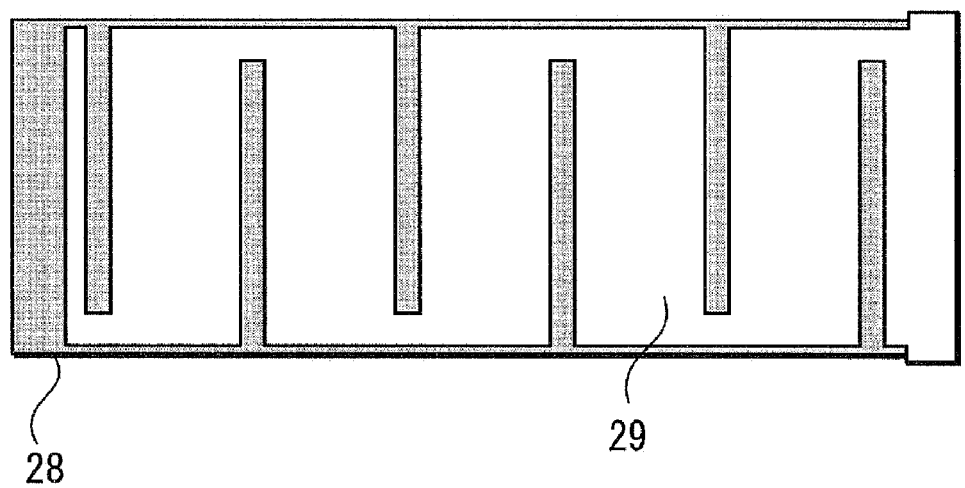
FIGS. 13A, 13B are plan configuration diagrams respectively illustrating an upper control electrode layer and a lower control electrode layer of the variable capacitor according to a modification of the fourth embodiment of the invention.
Figure 13B:
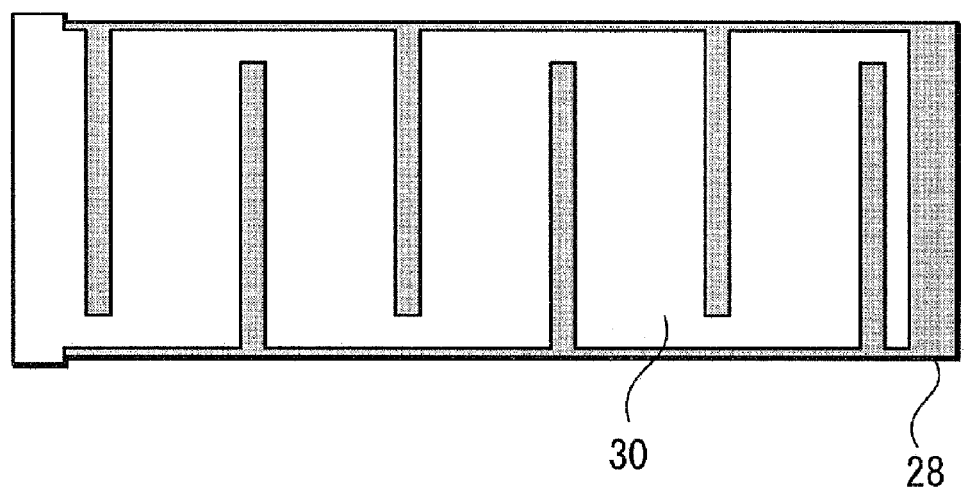
Figure 14:
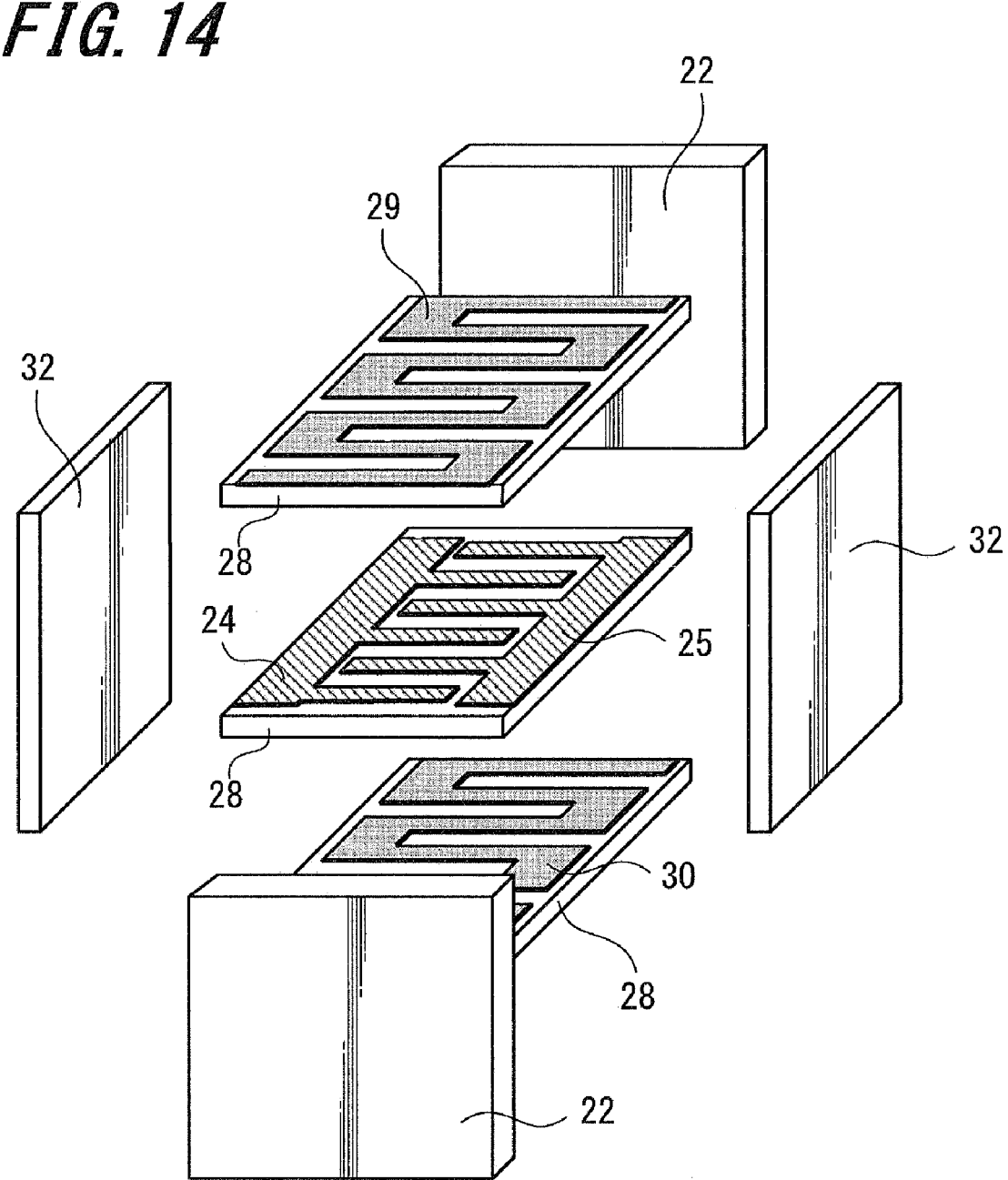
FIG. 14 is an exploded perspective diagram of the variable capacitor according to the modification of the fourth embodiment of the invention.

FIGS. 13A, 13B are configuration diagrams respectively illustrating an upper control electrode and a lower control electrode of the variable capacitor utilized for preventing occurrence of stray capacitance, according to the fourth embodiment of the invention. FIG. 13A shows a configuration example of an upper control electrode 29 for preventing occurrence of stray capacitance, and FIG. 13B shows a configuration example of a lower control electrode 30 for preventing occurrence of stray capacitance. FIG. 14 is a schematic exploded perspective diagram of the variable capacitor utilizing the upper control electrode 29 and lower control electrode 30. In FIGS. 13A, 13B, and FIG. 14, the same reference numerals are provided to the elements corresponding to those shown in FIGS. 12A, 12B, and duplicated descriptions thereof are omitted.

As illustrated in FIG. 14, the upper control electrode 29 and lower control electrode 30 are configured such that the portions thereof overlapped with the internal electrodes 24, 25 in y-axis direction are removed. That is, no electrodes are formed in the portions of the upper control electrode 29 and lower control electrode 30 that are overlapped with the internal signal electrodes 24, 25. The portions of the upper control electrode 29 and lower control electrode 30 that are removed in a comb-like shape are determined including tolerance for printing misalignment on the surfaces of the dielectric layer 28 and tolerance for positional misalignment when the internal signal electrodes 24, 25 and the upper control electrode 29 and lower control electrode 30 are layered.

The internal signal electrodes 24, 25 and the upper control electrode 29 and lower control electrode 30 are formed by printing metallic paste in desired patterns on planer ceramic green sheets that will be used as the dielectric layers. Thereafter, the dielectric layers 28, on which the internal signal electrodes 24, 25, the upper control electrode 29, and the lower control electrodes 30 are respectively formed, are layered as shown in FIG. 14, and sintered, and the control terminals 22 and the signal terminals 32 are then connected to extraction electrodes formed at ends of the upper control electrode 29, lower control electrode 30, and internal signal electrodes 24, 25, thereby fabricating a complete product of the variable capacitor.

The variable capacitor according to the fourth embodiment includes the electrodes each having the thickness of approximately 1 µm. Accordingly, even though the upper control electrode 29 and lower control electrode 30 include removed portions (where no electrodes are formed) for preventing stray capacitance, the layered dielectric layers are ceramitized via the removed portions without having any clearance by providing the dielectric layers 28 each having the thickness of approximately 2 to 10 µm on top of the lower control electrode 30 and under the upper control electrode 29 in a layered manner, and applying pressure to and sintering the layered dielectric layers.

Figure 15:
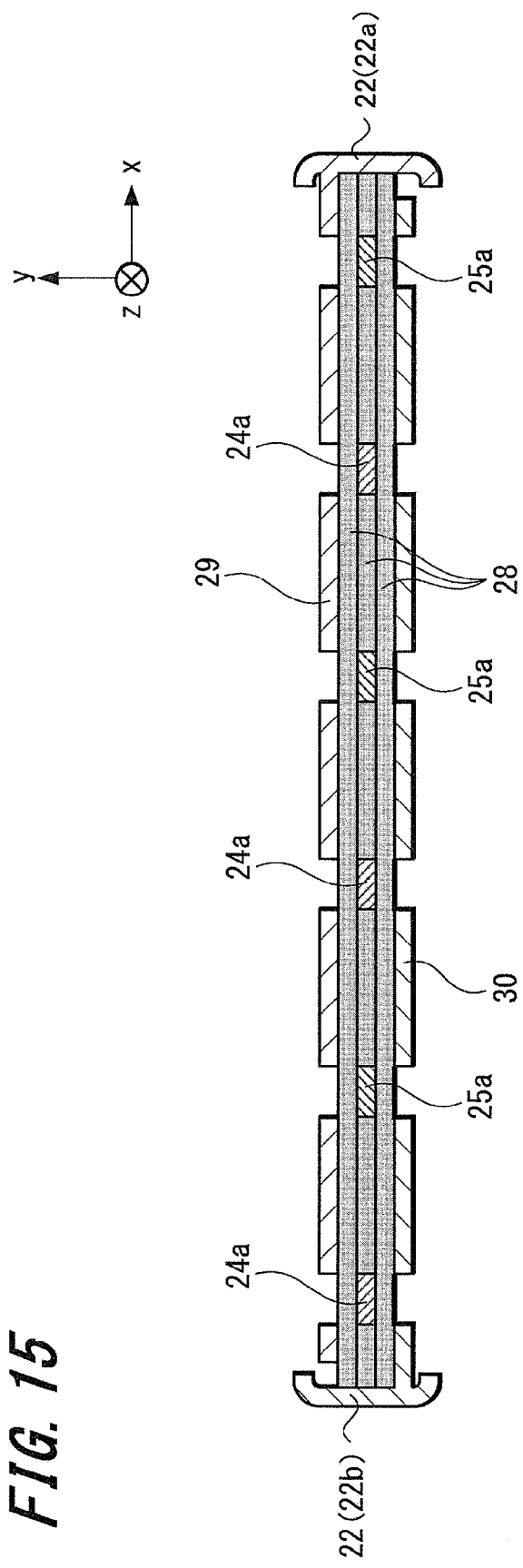
FIG. 15 is a schematic cross-sectional perspective diagram of the variable capacitor according to the modification of the fourth embodiment of the invention.

FIG. 15 is a schematic cross-sectional diagram of the variable capacitor utilizing the upper control electrode 29 and lower control electrode 30. As shown in FIG. 15, the portions of the upper control electrode 29 and lower control electrode 30 that are overlapped with the internal electrodes 24, 25 in y-axis direction are removed. Accordingly, the stray capacitance can be prevented from occurring between the internal signal electrodes 24, 25 connected to the signal terminals (not shown in FIG. 15) and the upper control electrode 29 and lower control electrode 30 connected to the control terminals 22.

Alternatively, a plurality of the variable capacitors shown in FIG. 15 may be arranged in a layered manner. FIG. 16A is a schematic configuration diagram illustrating a variable capacitor including three layers of comb-like structured internal electrodes 24, 25. In FIG. 16A, the same reference numerals are provided to the elements corresponding to those shown in FIG. 15, and duplicated descriptions thereof are omitted.

In an example of a variable capacitor including a plurality of layers (three layers in FIG. 16A) of comb-like structured internal signal electrodes 24, 25 arranged in a y-axis direction, the upper control electrode 29 and the lower control electrode 30 are formed above and below the internal signal electrodes 24, 25. In this case also, no electrodes are formed in the portions of the upper control electrode 29 and the lower control electrode 30 that overlap with the internal signal electrodes 24, 25.

Another countermeasures for preventing occurrence of the stray capacitance, other than the aforementioned one, in the variable capacitor including the comb-like structured internal signal electrodes 24, 25, may be to provide two layers of the comb-like structured internal signal electrodes 24, 25 between the upper control electrode 26 and the lower control electrode 23 as shown in FIG. 16B. The layered arrangement of a plurality of the internal signal electrodes 24, 25 having the same electric potential in the y-axis direction can decrease the stray capacitance that is generated between the vertically arranged comb-like structured internal signal electrodes 24, 25.

The variable capacitor including the comb-like structured internal electrodes according to the fourth embodiment can increase capacitance per unit area, which is effective for decreasing the size of the variable capacitor. In the internal signal electrodes 24, 25 shown in FIGS. 12A, 12B, when the metallized ratio M1 is obtained by the following approximate calculation: M1 $(\eta)=1.43\ \eta+0.285$, the capacitance $C_{IDT}$ is obtained as: $C_{IDT}=W \times N \times \in 1 \times M1\ (\eta)$; wherein W represents a length in an extended direction of a strip-like structured internal signal electrode; d1 represents a distance between adjacent strip-like structured internal signal electrodes; d2 represents a distance between a tip of a comb-like structured internal signal electrode and a portion of an extraction electrode facing thereto; d3 represents an interconnect width of a strip-like a signal electrode; L1 represents a distance between extraction electrodes; N represents the number of pairs of strip-like structured internal signal electrodes; ∈1 represents an effective dielectric constant; and η represents d1/d3.

Figure 17:
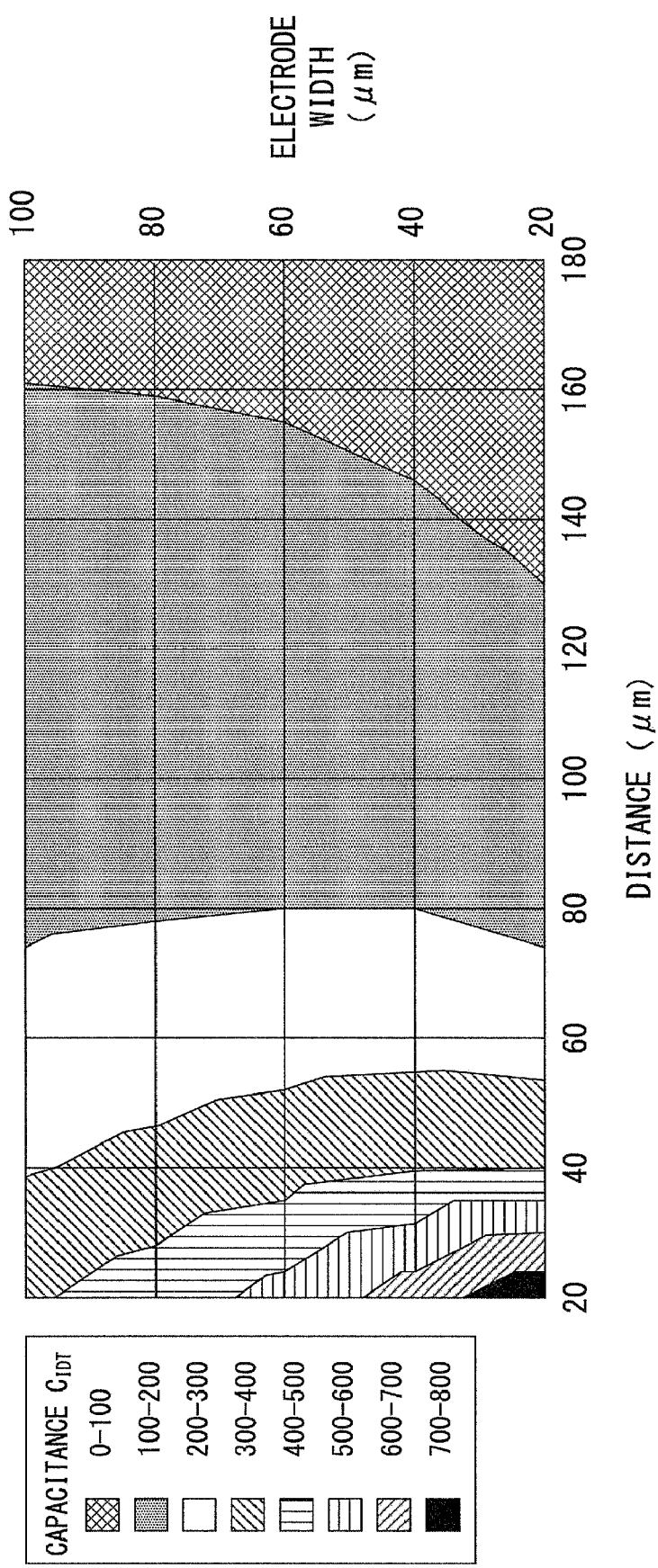
FIG. 17 is a graph showing measured capacitance of the variable capacitor according to the fourth embodiment of the invention.

FIG. 17 is a graph showing measured capacitance value of the variable capacitor according to the fourth embodiment of the invention. The measured values represented on the graph of FIG. 17 indicate capacitance $C_{IDT}$ of the variable capacitor in FIG. 15 that is designed to be 2.5 mm in length in an x-axis direction, and 1.25 mm in a y-axis direction. Of the graph, a horizontal X-axis indicates a distance obtained by d1-d3, a vertical Y-axis indicates an interconnect width d3, and the capacitance $C_{IDT}$ is represented by different patterns according to a relationship between the distance and interconnect width d3.

The capacitance varies with a distance between electrodes or a width of each electrode, and the capacitance can be increased by reducing the distance and the width of the electrode. If electrodes are desired to have a width of about several tens μm, such electrodes can be fabricated by low cost coating; however, if they are, on the other hand, desired to have a width of several μm, which is difficult be realized by coating, the electrodes can be fabricated by sputtering or the like. The aforementioned characteristic of the capacitance, i.e., being determined according to the width of the electrode, applies to the case that the electrode is formed in one layer, and hence the capacitance can be increased by providing a plurality of electrodes in a layered manner.

As described above, in each of the variable capacitors according to the first to fourth embodiments, the control capacitance can be changed by the control electric field that intersects with the signal electric field, thereby also changing the signal capacitance. Further, pressure resistance to the signal electrode can be designed independently of pressure resistance to the control electrode. In addition, by appropriately arranging the signal electrodes and the control electrodes such that the intensity of the signal electric field lower than that of the control electric field, the control voltage applied to the control electrode can be lowered while maintaining the pressure resistance to the signal electrode. Consequently, high signal voltage can be applied to the variable capacitor that is controlled by low control voltage.

[Embodiment of Electronic Device]

Figure 18:
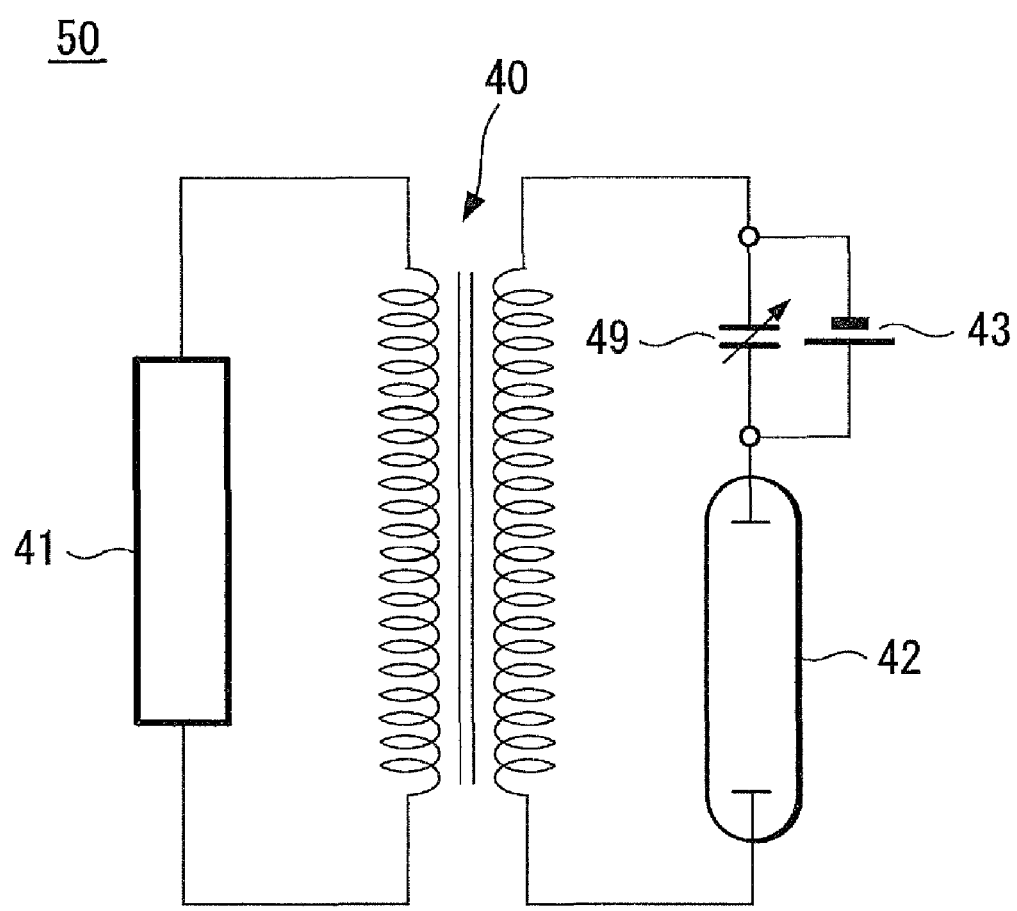
FIG. 18 is a schematic circuit configuration showing one example of an electronic device according to one embodiment of the invention.

The variable capacitors according to the embodiments of the invention may each be utilized for an electronic device shown in FIG. 18. FIG. 18 shows a backlight inverter circuit configuration of CCFL (Cold Cathode Fluorescent Lamp) utilized for a liquid crystal television as one embodiment of the electronic device.

The inverter circuit 50 shown in FIG. 18 includes CCFL 42, a booster transformer 40 connected to the CCFL 42, and a driver circuit 41 driving the booster transformer 40. In addition, a ballast capacitor formed of a variable capacitor 49 is also provided between the CCFL 42 and the booster transformer 40. Examples of the variable capacitor 49 utilized for the ballast capacitor include the aforementioned variable capacitors according to the first to fourth embodiments. In addition, a control voltage power supply 43 connected to the control terminals is also provided between the CCFL 42 and the booster transformer 40.

The inverter circuit in the example shown in FIG. 18 only includes one CCFL 42, however, may include two CCFLs 42 connected in parallel. A high AC voltage (alternating voltage) boosted by the booster transformer 40 is applied to the CCFL 42 via the ballast capacitor of the variable capacitor 49. Output power of the booster transformer 40 is normally about 1500 V, 51 kHz. The electric current flown into the CCFL 42 is 5 to 10 mA. The ballast capacitor formed of the variable capacitor 49 is typically used for stabilizing two CCFLs 42 when driving the CCFLs 42 in parallel; however, and a transformer may sometimes be used in addition to the capacitor.

The ballast capacitor is employed for CCFL backlight for reducing the fabrication cost; however, the use of the ballast capacitor may cause luminance heterogeneity in CCFL backlight because current intensities may vary between the CCFLs due to variability in the capacitance between the CCFLs, and due to variability in the stray capacitance between the CCFLs and metallic materials of peripherals.

Thus, in this example, the capacitance is adjusted using the variable capacitor 49 formed of the ballast capacitor. For the adjustment of the capacitance value of the variable capacitor 49, DC (Direct current) voltage is applied to the control terminals (not shown) of the variable capacitor 49 by the control voltage power supply 43 connected the control terminals thereof. The capacitance value of the variable capacitor 49 is thus adjusted by the application of desired DC voltage to the control terminals of the variable capacitor 49. If high DC voltage is applied to terminals of the booster transformer 40, excessive current may flow into transformer coils. However, in this example, DC voltage is applied to the control terminals of the variable capacitor 49. Thus, when the voltage is applied to the control terminals of the variable capacitor 49 to adjust the capacitance value thereof, the voltage may not directly be applied to the booster transformer 40 and CCFL 42 each connected to the signal terminals of the variable capacitor 49. The capacitance value of the variable capacitor 49 mounted on the inverter circuit 50 can be adjusted by applying the voltage to the variable capacitor 49. In the CCFL backlight including the variable capacitor 49, the capacitance value thereof can be adjusted so as to exhibit heterogeneous luminance of the CCFL 42.

The inverter circuit employing the variable capacitor 49 according to the aforementioned first to fourth embodiments can lower desired control voltage while retaining the pressure resistance to the signal terminals. For example, the capacitance value of the variable capacitor 49 can be adjusted by applying the control voltage that is one hundredth to three-hundredth of output power of the booster transformer 40.

In this embodiment, the inverter circuit is used as an example of the electronic device on which the variable capacitor is mounted; however, the variable capacitor can also be implemented in other devices such as a non-contact type IC card. Thus, since the variable capacitor is mounted on the electronic device, the control voltage can be applied to the variable capacitor without affecting other circuits on the electronic device, thereby obtaining a desired capacitance value. Although mass-produced devices having such variable capacitors exhibit scattered tuning frequencies due to variability thereof, the scattered tuning frequencies can be adjusted by causing the variable capacitors to include desired capacitance values at shipment.

The present application contains subject matter related to that disclosed in Japanese Patent Priority Application JP 2008-116242 filed in the Japanese Patent Office on Apr. 25, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A variable capacitor comprising:
   signal electrodes configured to sandwich a dielectric layer so as to generate a signal electric field; and
   control electrodes configured to sandwich the dielectric layer so as to generate a control electric field in a direction intersecting with the signal electric field generated between the signal electrodes, wherein a first capacitance value of signal capacitance created between the signal electrodes depends on a second capacitance value of control capacitance created between the control electrodes in the direction intersecting with the signal electric field.

2. The variable capacitor according to claim 1, wherein an electric field intensity of the signal electric field differs from an electric field intensity of the control electric field.

3. The variable capacitor according to claim 2, wherein the electric field intensity of the signal electric field is lower than the electric field intensity of the control electric field.

4. The variable capacitor according to claim 1, further comprising a plurality of dielectric layers, wherein:
the control electrodes and the signal electrodes are provided in a layered manner via the plurality of dielectric layers such that a distance between the signal electrodes, areas of arranging the signal electrodes, a distance between the control electrodes, and areas of arranging the control electrodes can individually be predetermined.

5. The variable capacitor according to claim 4, wherein:
the signal electrodes and the control electrodes include desired patterns, or are arranged on desired positions of the dielectric layers such that there are no overlaps between the signal electrodes and the control electrodes in a layered direction.

6. An electric device comprising:
a power supply; and
a variable capacitor including:
signal electrodes configured to sandwich a dielectric layer so as to generate a signal electric field; and
control electrodes configured to sandwich the dielectric layer so as to generate a control electric field in a direction intersecting with the signal electric field generated between the signal electrodes, wherein a first capacitance value of signal capacitance created between the signal electrodes depends on a second capacitance value of control capacitance created between the control electrodes in the direction intersecting with the signal electric field.

7. The electric device according to claim 6, wherein an electric field intensity of the signal electric field differs from an electric field intensity of the control electric field.

8. The electric device according to claim 7, wherein the electric field intensity of the signal electric field is lower than the electric field intensity of the control electric field.

9. The electric device according to claim 6, wherein:
the variable capacitor further comprises a plurality of dielectric layers; and
the control electrodes and the signal electrodes are provided in a layered manner via the plurality of dielectric layers such that a distance between the signal electrodes, areas of arranging the signal electrodes, a distance between the control electrodes, and areas of arranging the control electrodes can individually be predetermined.

10. The electric device according to claim 6, wherein:
the control electric field intersects with the signal electric field at a right angle.

11. The variable capacitor according to claim 1, wherein:
the control electric field intersects with the signal electric field at a right angle.

12. The variable capacitor according to claim 1, wherein:
the dielectric layer is formed of at least one ferroelectric material.

13. The variable capacitor according to claim 12, wherein:
the at least one ferroelectric material comprises at least one material selected from the group consisting of at least one ionic polarized ferroelectric material and at least one electronically polarized ferroelectric material.

14. The variable capacitor according to claim 1, wherein:
the dielectric layer is formed of an anisotropic dielectric material.

15. The variable capacitor according to claim 1, wherein:
the signal electrodes comprise:
a first signal terminal arranged on a first side of the dielectric layer; and
a second signal terminal arranged on a second side of the dielectric layer that is opposite to the first side; and
the control electrodes comprise:
a first control terminal having a first planar surface that is in contact with at least one first internal control electrode extended perpendicular to the first planar surface; and
a second control terminal having a second planar surface that is in contact with at least one second internal control electrode extended perpendicular to the second planar surface; wherein:
the first planar surface is arranged on a third side of the dielectric layer that is perpendicular to the first side and the second side, and
the second planar surface is arranged on a fourth side of the dielectric layer that is opposite to the third side.

16. The variable capacitor according to claim 15, wherein:
the at least one first internal control electrode comprises a first plurality of internal control electrodes;
the at least one second internal control electrode comprises a second plurality of internal control electrodes; and
the first plurality of internal control electrodes are arranged alternately with the second plurality of internal control electrodes so that at least a portion of at least one of the first plurality of internal control electrodes extends over at least a portion of at least one of the second plurality of internal control electrodes.

17. The variable capacitor according to claim 15, wherein:
the at least one first internal control electrode is arranged in the dielectric layer at a distance from the at least one second internal control electrode.

18. The variable capacitor according to claim 17, wherein:
capacitance is created in the dielectric layer between the at least one first internal control electrode and the at least one second internal control electrode; and
the variable capacitor is configured so that control voltage applied between the first control terminal and the second control terminal to control a value of the capacitance is decreased by decreasing the distance.

19. The variable capacitor according to claim 1, wherein:
the control electrodes comprise:
at least one upper control electrode, and
at least one lower control electrode; and the signal electrodes comprise:
at least one internal signal electrode arranged in the dielectric layer between the at least one upper control electrode and the at least one lower control electrode in a pattern so that portions of the at least one upper control electrode and the at least one lower control electrode that overlap with the at least one internal signal electrode are removed from the at least one upper control electrode and the at least one lower control electrode.

* * * * *